(12) United States Patent
Stimpson et al.

(10) Patent No.: US 9,191,866 B2
(45) Date of Patent: Nov. 17, 2015

(54) TECHNIQUES FOR EXECUTING A HANDOFF PROFILE BETWEEN TELECOMMUNICATIONS NETWORKS

(71) Applicant: Bandwidth.com, Inc., Raleigh, NC (US)

(72) Inventors: Jesse Stimpson, Raleigh, NC (US); Adam Cook, Apex, NC (US); Kyle White, Raleigh, NC (US); Charlie Surface, Durham, NC (US)

(73) Assignee: BANDWIDTH.COM, INC., Raleigh, NC (US)

( * ) Notice: Subject to any disclaimer, the term of this patent is extended or adjusted under 35 U.S.C. 154(b) by 0 days.

(21) Appl. No.: 14/705,243

(22) Filed: May 6, 2015

(65) Prior Publication Data

US 2015/0237537 A1 Aug. 20, 2015

Related U.S. Application Data

(60) Continuation-in-part of application No. 14/658,716, filed on Mar. 16, 2015, now Pat. No. 9,060,315, which is a division of application No. 14/580,411, filed on Dec. 23, 2014, now Pat. No. 9,014,147, which is a continuation-in-part of application No. 14/287,269, filed on May 27, 2014, now Pat. No. 8,879,507.

(51) Int. Cl.
*H04W 4/00* (2009.01)
*H04W 36/00* (2009.01)

(52) U.S. Cl.
CPC ................... *H04W 36/0022* (2013.01)

(58) Field of Classification Search
CPC .................. H04W 80/04; H04W 36/18
USPC .................. 370/331, 332; 455/436, 439, 442
See application file for complete search history.

(56) References Cited

U.S. PATENT DOCUMENTS

| 8,576,833 | B2* | 11/2013 | Qiu | H04L 12/66 370/352 |
|---|---|---|---|---|
| 2004/0198357 | A1* | 10/2004 | Plyle et al. | 455/435.3 |
| 2006/0286984 | A1* | 12/2006 | Bonner | 455/445 |
| 2008/0144605 | A1* | 6/2008 | Qiu | H04M 7/0084 370/352 |
| 2009/0036128 | A1* | 2/2009 | Raguparan et al. | 455/436 |
| 2014/0011510 | A1* | 1/2014 | Balck et al. | 455/452.1 |

* cited by examiner

*Primary Examiner* — Chuong T Ho
(74) *Attorney, Agent, or Firm* — Gregory Stephens

(57) ABSTRACT

Examples are disclosed for executing a handoff profile for a mobile device. Communication link handoff logic may be executed by a processor to detect an 802.11 network access point and register the mobile device with a call server over the 802.11 network access point. Thereafter, a first timer may be initiated for a specified duration wherein the registration between the mobile device and the call server over the 802.11 network access point is maintained without interruption for the duration of the first timer. Upon successful expiration of the first timer, a second timer may be initiated for a specified duration wherein VoIP communication link parameters for the 802.11 link between the mobile device and the call server are deemed sufficient for the entire duration of the second timer. Upon successful expiration of the second timer, a handoff may be performed between the mobile device and the call server from the cellular communication link to the 802.11 link.

21 Claims, 18 Drawing Sheets

100

400

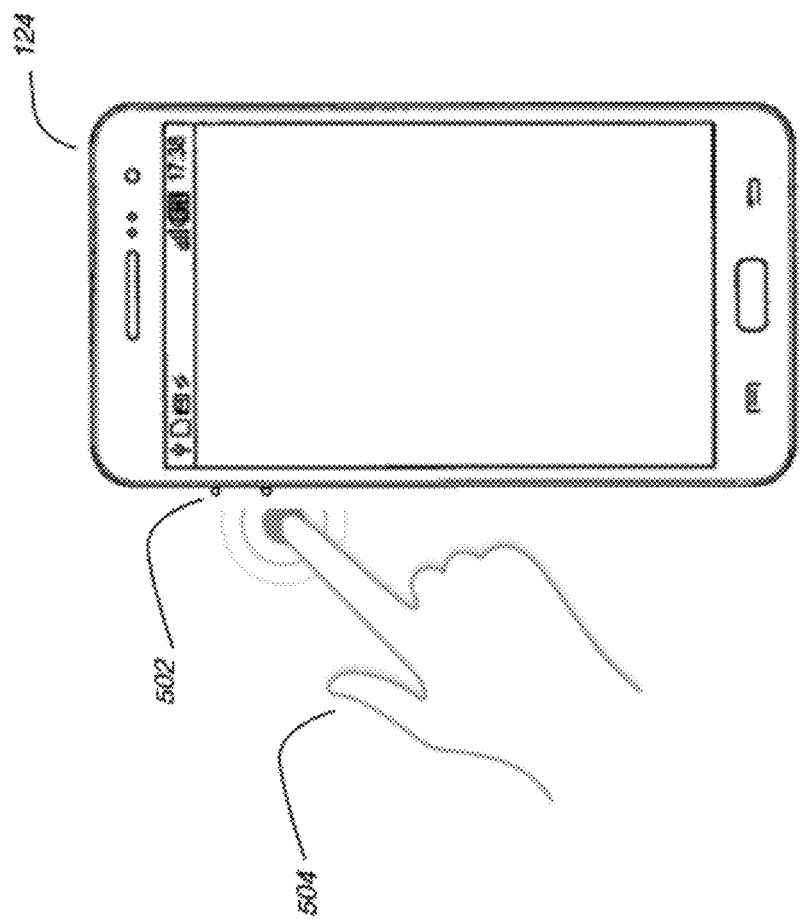

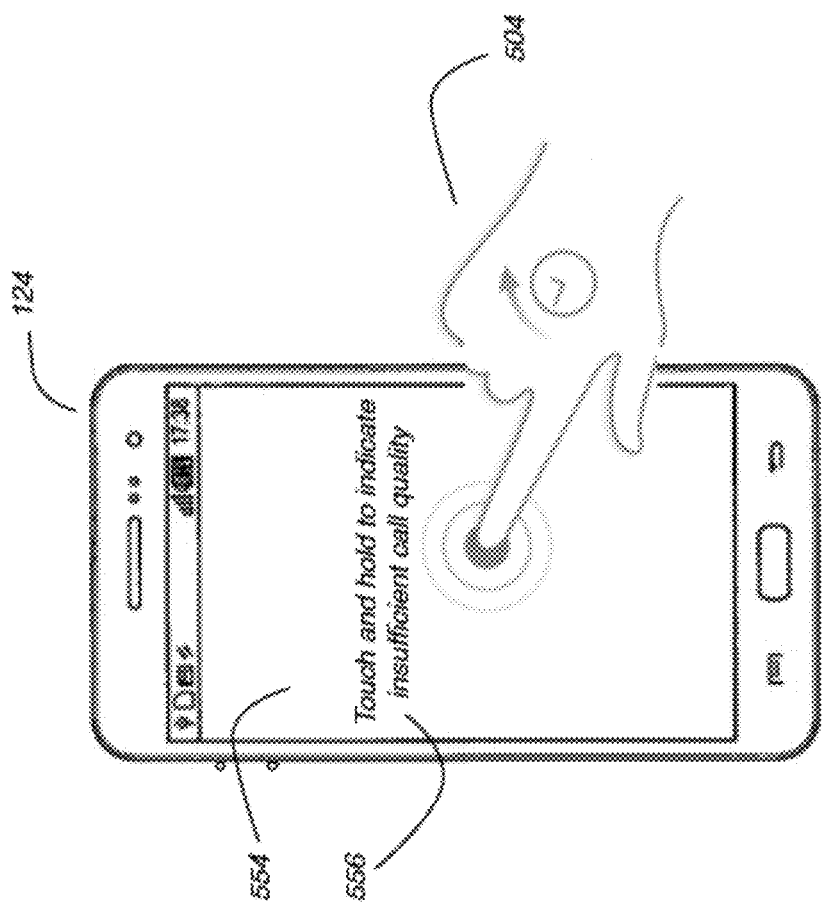

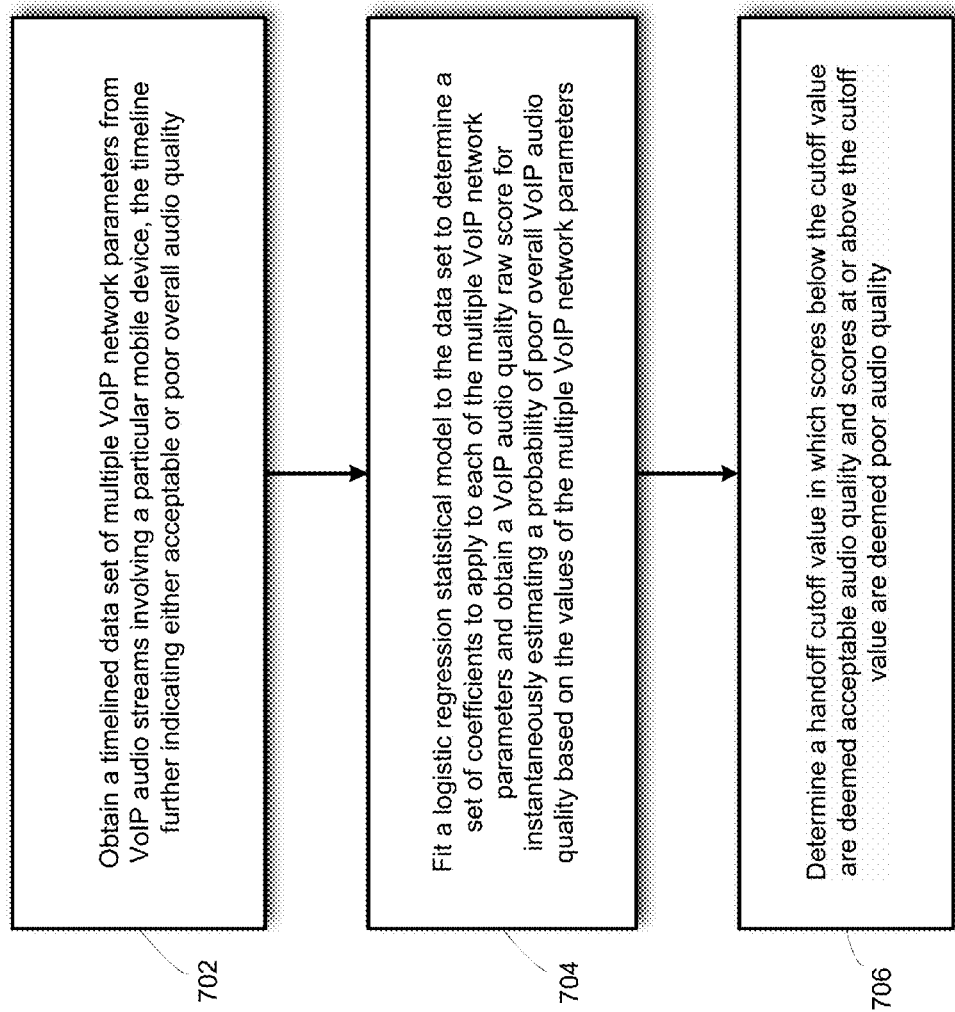

FIG. 7A
700

702 — Obtain a timelined data set of multiple VoIP network parameters from VoIP audio streams involving a particular mobile device, the timeline further indicating either acceptable or poor overall audio quality 704 — Fit a logistic regression statistical model to the data set to determine a set of coefficients to apply to each of the multiple VoIP network parameters and obtain a VoIP audio quality raw score for instantaneously estimating a probability of poor overall VoIP audio quality based on the values of the multiple VoIP network parameters 706 — Determine a handoff cutoff value in which scores below the cutoff value are deemed acceptable audio quality and scores at or above the cutoff value are deemed poor audio quality

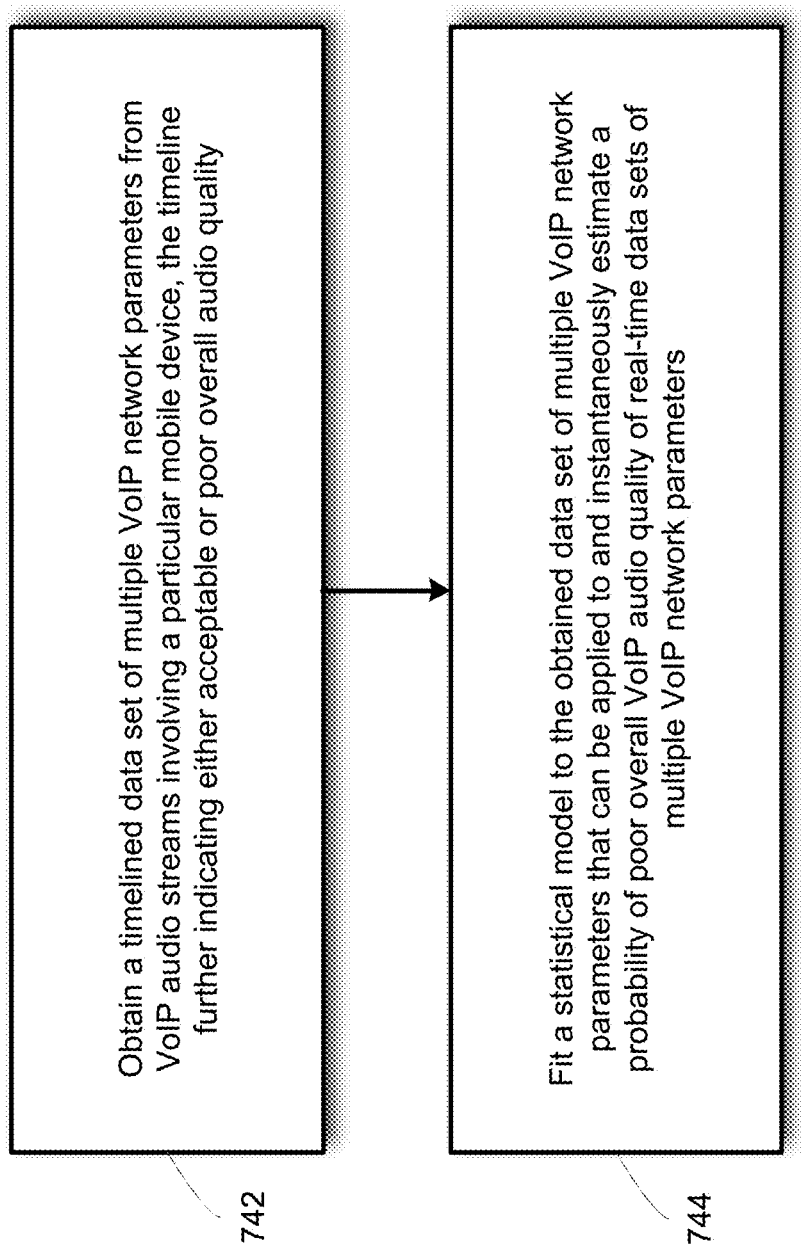

FIG. 7C
740

742 — Obtain a timelined data set of multiple VoIP network parameters from VoIP audio streams involving a particular mobile device, the timeline further indicating either acceptable or poor overall audio quality 744 — Fit a statistical model to the obtained data set of multiple VoIP network parameters that can be applied to and instantaneously estimate a probability of poor overall VoIP audio quality of real-time data sets of multiple VoIP network parameters

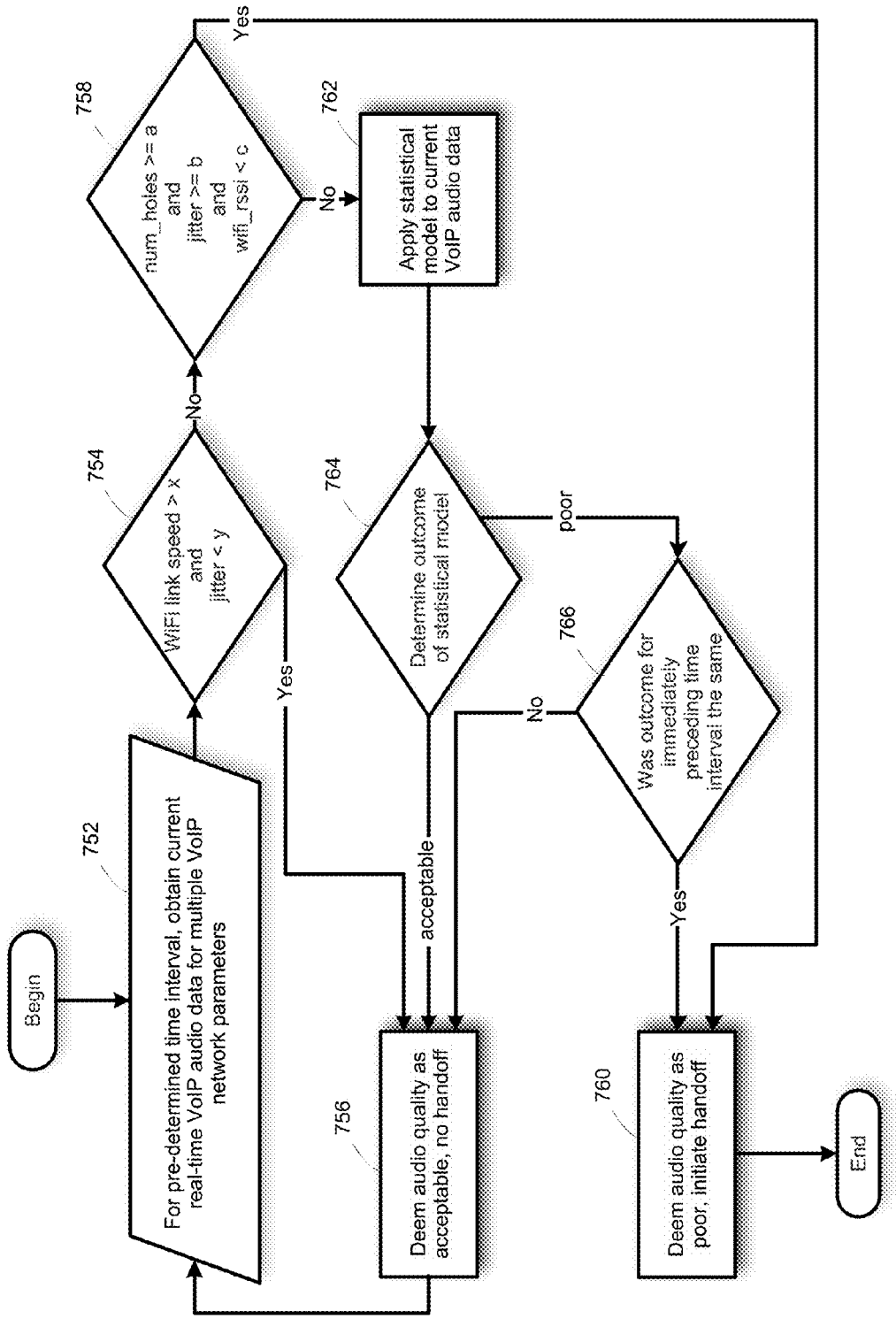

800

850

TECHNIQUES FOR EXECUTING A HANDOFF PROFILE BETWEEN TELECOMMUNICATIONS NETWORKS

CROSS-REFERENCE TO RELATED APPLICATIONS

This application is a continuation-in-part of U.S. application Ser. No. 14/658,716 filed Mar. 16, 2015 entitled "Techniques for Establishing and Executing a Handoff Profile Between Telecommunications Networks" which is a divisional application of U.S. application Ser. No. 14/580,411 filed Dec. 23, 2014 entitled "Techniques for Establishing and Executing a Handoff Profile Between Telecommunications Networks" which is a continuation in part of U.S. application Ser. No. 14/287,269 filed May. 27, 2014 entitled "Techniques for Establishing a Handoff Profile Using User Feedback".

TECHNICAL FIELD

Examples described herein are generally related to techniques for establishing and executing a handoff profile for a dual network communication device operable on multiple telecommunications networks.

BACKGROUND

Mobile telephony devices utilizing wireless communication protocols are ubiquitous. Many of these devices utilize one of the competing cellular networks (e.g., GSM or CDMA) to place and receive telephone calls to other telephony endpoint devices. A telephony endpoint device may include another mobile telephony device on the same or another cellular network, a Voice-over-IP (VoIP) telephony device, and/or a plain old telephone service (POTS) telephony device. Each of these telephony endpoint devices may use a different access network but all are interfaced at some point to allow for communication among the different networks.

Recently, there has been introduced another type of mobile telephony device, one that is capable of utilizing multiple different networks depending on the current location or network conditions pertaining to the mobile telephony device. Such a mobile telephony device may be characterized as a hybrid mobile device due to its capability of making and receiving telephone calls on at least two distinct networks. Some hybrid mobile devices include the ability to start or establish a telephone call on one network (e.g., an IP based VoIP network over a wireless fidelity (WiFi) connection) and handoff the call to a second network (e.g., a cellular network) when conditions on the original network degrade. Such a handoff may occur, for instance, when the mobile hybrid device moves out of range of the IP based WiFi access point. Rather than dropping the call, the hybrid mobile device, in conjunction with the a network based server, may switch to a cellular connection prior to severing the WiFi VoIP connection thereby ensuring that the hybrid mobile device stays connected to the other telephony endpoint and the call is not dropped.

Determining when to initiate the handoff to avoid dropping a call can vary based on a number of factors, including but not limited to network conditions, signal strength, location and the like and is typically set based on manufacturer or carrier default settings. Incorporating user feedback and/or historical data with respect to actual call quality and network conditions into this determination may improve the user experience and the device and network performance. As such, described herein are methods, systems, and techniques for establishing a handoff profile based on various communication link parameters using user feedback.

BRIEF DESCRIPTION OF THE DRAWINGS

FIG. 5A illustrates an example of a first operating environment.
FIG. 5B illustrates an example of a second operating environment.
FIG. 7A illustrates an example of a sixth logic flow.
FIG. 7C illustrates an example of an eighth logic flow.
FIG. 7D illustrates an example of a ninth logic flow.

DETAILED DESCRIPTION

Figure 1:
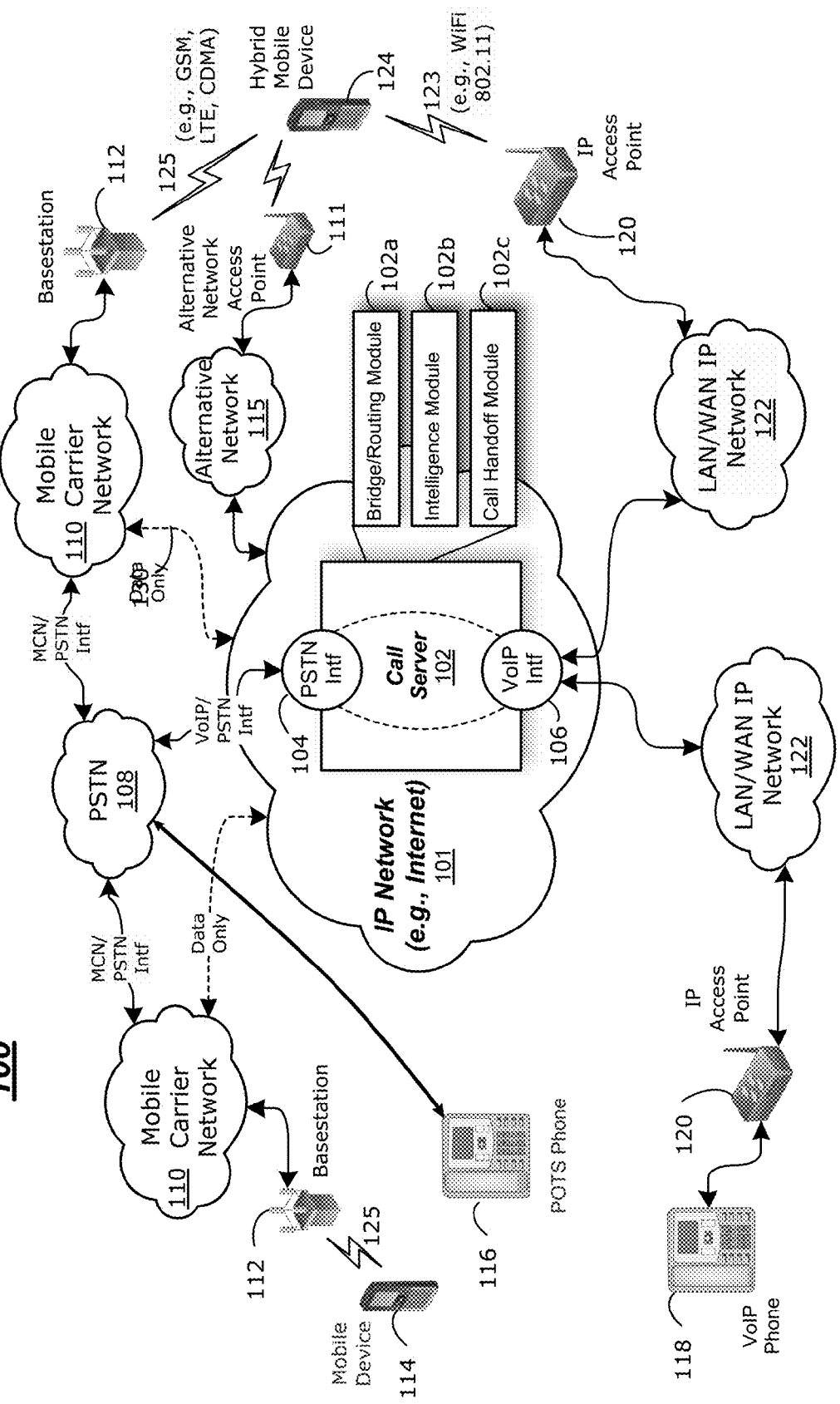
FIG. 1 illustrates an example block diagram for a networked environment.

The embodiments described herein disclose systems and methods for intelligently incorporating user feedback and/or historical data to establish a handoff profile based on various communication link parameters to enhance communication sessions between or among communication devices. The systems and methods of the invention may be embodied in and performed by communication devices, call servers and other devices, and software instructions executed by some or all of such devices, as will be explained in detail below. The different types of networks contemplated herein include, for example, cellular mobile networks, the public switched telephone network (PSTN), and data networks, such as the Internet or other IP-based networks, including wide area networks, local area networks, and combinations thereof.

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical or logical channel that connects two or more devices. A communication link may be a signaling link or a media link. In this context, a communication session may be established via one or more communication links. One or more media streams may be transmitted over a communication link. A call server may be situated between communication devices thereby making the call server an endpoint in a communication link. The call server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure discusses access networks that may be characterized as the portion of a communication network that connects subscriber communication devices to a service provider's core network. An access network may also be referred to as the interface between the communication device and the network. Another type of interface may be the interface between networks. That is, the interface necessary to facilitate seamless communication from one network to another.

Therefore, references herein to a communication device capable of connecting to or communicating via a mobile carrier network refer to a communication device equipped with a cellular transceiver for wireless communication with base stations and other mobile carrier network access points. Similarly, references herein to a communication device capable of connecting to or communicating via a data network refer to a communication device equipped with a transceiver or other network interface for wireless communication (e.g., 802.11) with a router or other data network access point. One particular communication device may be characterized herein as a wireless handset or mobile device. A wireless handset or mobile device may include multiple RF transceivers, one of which may be operable to connect to an access network for a mobile carrier network (e.g., cellular network) and another of which may be operable to connect to an access network for an IP data network (e.g., 802.11) or combinations thereof.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 101, one or more IP based local area networks or wide area networks (LAN/WAN) 122, mobile carrier networks 110, and the PSTN 108. While these distinct networks utilize different protocols and signaling schemes, there are various interfaces that allow for the seamless transition of voice and data (including text, audio, and video) such that various communication endpoints may communicate with one another over one or more of these inter-connected networks.

The PSTN 108 can be characterized as a circuit switched point-to-point communication network in which a physical connection between the endpoints is maintained for the duration of the connection. The PSTN 108 may also be referred to as the legacy telephone network as it is the backbone infrastructure for connecting endpoints comprised of Plain Old Telephone Service (POTS) phones 116.

Mobile carrier networks 110 (sometimes referred to as cellular networks) may come in different varieties based on the radio transmission scheme 125 between a communication device known as a wireless handset (e.g., mobile or cellular phone) 114 and the mobile carrier network base station 112 that is in communication with the wireless handset 114. Two such radio transmission schemes are the Global System for Mobile Communication (GSM) and Code Division Multiple Access (CDMA). These radio transmission schemes are incompatible with one another necessitating an intervening interface to allow communication between endpoints on either network. In addition, each network may operate over a specific frequency ranges. Often, there may even be an intervening network such as the PSTN 108 between two distinct mobile carrier networks 110. Each mobile carrier network 110 includes an interface to the PSTN 108 such that calls crossing that interface can be handled by the receiving network whether it is a mobile carrier network 110 or the PSTN 108.

Various mobile carrier network operators base their network on one of the radio transmission schemes 125 and provide service to wireless handsets 114 using that radio transmission scheme 125 over a defined frequency band. For example, a wireless handset 114 wirelessly communicates with a base station 112 that serves as an access network to the mobile carrier network 110. The base station 112 authenticates and authorizes the wireless handset 114 to the mobile carrier network 110 and, in conjunction with other equipment within the mobile carrier network 110, manages calls to and from the wireless handset 114. The mobile carrier network 110 provides connectivity for any wireless handsets 114 capable of cellular transmission that are physically located within range of the mobile carrier network 110. The range of a mobile carrier network 110 depends in part on an amplification, power, and/or energy associated with the antennas comprising cellular base station, wireless handsets 114 and the like. As the wireless handset 114 moves toward the outer range of the mobile carrier network 110, the strength of the cellular signals degrade.

Similarly, an IP based data network 122 like the Internet 101 may provide wireless connectivity to wireless handsets 114 within range of an IP access point 120. For instance, an IP access point 120 may provide wireless connectivity using any of the 802.11 WiFi standards and/or any other type of IP based connectivity standard. As will be appreciated by those of skill in the art, a wireless handset 114 may experience a stronger connection signal when located closer to an IP access point 120 than when located further away from the IP access point 120. Thus, the strength of the wireless data connection may fade as the wireless handset 114 moves away from an IP access point 120.

There may also be one or more alternative networks 115 that may provide access to the Internet 101 for a hybrid mobile device 124 or other wireless handset devices 114. One such alternative network 115 may be characterized as a WiMAX network operable over the 802.16 wireless protocol standard. Another such alternative network 115 may be characterized as a whitespace network. A whitespace network may utilize RF spectrum that is shared with television broadcasters. The television broadcasters do not necessarily utilize all the spectrum allocated to them to broadcast their video signals. The unused spectrum may be tapped into to provide an alternative RF access point to an alternative network 115 that can interface with the Internet 101.

The collection of IP based data networks illustrated in FIG. 1 such as LAN/WANs 122, and the Internet 101 all run on a packet based data transfer protocol characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. End user devices 118 utilize an IP access point 120 to access the larger IP network. The IP access point 120 may be wired, wireless (e.g., WiFi), or a combination wired/wireless access point such as those illustrated in FIG. 1. A VoIP communication device 118 may communicate with an IP access point 120 to gain access to the larger IP network 101 and other communication devices. The VoIP communication device 118 has been illustrated as a wireline type device but may just as easily be a wireless device communicable with the IP access point 120 over, for instance, one or more of the 802.11 protocols.

In certain embodiments, mobile carrier network(s) 110 include cellular networks or portions of cellular networks based on GSM, LTE, CDMA, and/or any other cellular network standards. IP based data networks 122, 101 include, for example, the Internet, one or more intranets, wide area networks (WANs), local area networks (LANs), and the like, portions or all of which may be wireless and/or wired. For instance, an IP based data network 122, 101 may be a wireless network or a portion of a wireless network implemented using an IEEE 802.11 standard, WiMAX, and/or any other wireless data communication standard. As is known in the art, the resources the various networks 108 (PSTN), 110 (Mobile Carrier), 122, 101 (IP Based) may interface with the call server 102 through gateway devices, routers and/or other appropriate devices (not shown). Similarly, the wireless handsets 114 may interface with the various networks 108 (PSTN), 110 (Mobile Carrier), 122, 101 (IP based) and alternative networks 115 through appropriate access points 111, 120 (some not shown).

As one may surmise, it is far less complicated when both communication devices in a communication system utilize the exact same network. For instance, POTS phone to POTS phone would communicate over the PSTN only while a GSM wireless handset to another GSM wireless handset of the same mobile service provider may be handled within the mobile carrier network. Lastly, a VoIP phone calling another VoIP phone would stay exclusively on a packet based series of networks like LAN/WANs, 122 and/or the Internet 101.

Things get more complicated when the communication devices are associated with different networks. For instance, a POTS phone placing a call to a wireless handset or a VoIP phone calling a POTS phone. In these scenarios, and others, there is an interface between the networks that serves to resolve any differences so that a communication session may be connected and maintained. As described above there may be an intervening network between two endpoint networks. For instance, each mobile carrier network 110 includes an interface to the PSTN 108 such that calls crossing that interface can be handled by the receiving network whether it is a mobile carrier network 110 or the PSTN 108. Similarly, each VoIP service provider on an IP packet based network 122, 101 includes an interface to the PSTN 108 such that calls crossing that interface can be handled by the receiving network whether it is an IP packet based network 122, 101 or the PSTN 108. Thus, the PSTN 108 serves as a common routing network for endpoint communication devices that are associated with other networks. It is possible to create a VoIP interface such that IP packet based networks 122, 101 can interface directly with mobile carrier networks 110.

There is one aspect that each network (e.g, PSTN 108, VoIP 101, 122 and mobile carrier 110) has in common that facilitates communication sessions among communication devices native to the various networks. The commonality is that each communication device has a unique telephone number (TN) as an identifier. The format of the telephone number is identical regardless of the network in use. In North America, for instance, the TN is a ten-digit number. Each communication device in North America is associated with a 10-digit telephone number that subscribers 'dial' to reach other subscribers no matter the network the other subscriber uses. Thus, users of communication devices need not worry about how to reach another user because all communication devices key off an associated telephone number. From the user's perspective, it is up to the networks to resolve any connection issues and allow calls to be connected so that a communication session may occur. For the most part, these network differences have been resolved on an industry wide scale and it is relatively routine to place and connect calls between endpoints regardless of their native networks.

Each network service provider may provide equipment (communication devices) and service plans to its subscribers. These service plans can vary greatly in cost depending on the expected use of network resources. In addition, some service plans may bundle data and voice services in the cost of the service plan. This is often the case for mobile carrier network 110 subscribers since the ability to access data networks such as the Internet on a mobile device is a desired service. This is especially the case when a WiFi data connection is out of range. As a result, bundled voice and data services can place a significant burden on the mobile carrier network resources that can lead to use restrictions for bundled voice/data plans.

One approach that addresses the mobile network congestion problem is a communication device that may be characterized as a hybrid mobile device 124. The hybrid mobile device 124 may be associated with network infrastructure that defaults telephony services to a WiFi connection 123 using, for instance, VoIP over an 802.11 protocol via an IP access point 120. The hybrid mobile device 124 may default to WiFi mode when available and may only switch to a mobile carrier network 110 connection via a radio transmission scheme 125 to a basestation 112 (cellular mode) when the WiFi connection 123 is lost, is unavailable or degrades in quality to the point that the connection can no longer support telephony services. As it pertains to data, this heterogeneous network switching may be referred to as WiFi offloading. For telephony services, however, such a soft handover between heterogeneous networks is a more daunting and complex process.

One implementation of a soft handover of a voice call between heterogeneous networks involves associating two telephone numbers to a hybrid mobile device 124. A first telephone number may be characterized as a 'data' telephone number that is based on a VoIP telephony scheme. The second number may be characterized as a 'mobile' telephone number that is used in conjunction with a radio transmission scheme 125 associated with a mobile carrier network 110. The subscriber may only be aware of the data number and not have actual knowledge of the mobile number. For all intents and purposes, the subscriber places and receives calls using the data telephone number. To reach the subscriber, a second communication device would dial the subscriber's data telephone number.

When the hybrid mobile device 124 is connected with an IP access point 120, telephony services and functions are handled using VoIP. To dial out, the subscriber dials the telephone number of the intended recipient's communication device. The intelligence within the hybrid mobile device 124 recognizes that the subscriber is attempting to place a call and notes the telephone number entered. The call from the hybrid mobile device 124 is routed to a call server 102 hosted in an IP based network 101 such as the Internet and establishes a first communication link. The call server 102 then determines the intended telephone number that was dialed by the subscriber and places a call to the communication device associated with that telephone number (called communication device). Upon connecting the second communication link between the call server and the called communication device, the call server 102 joins the first communication link with the second communication link to create a full-duplex communication session between the hybrid mobile device 124 and the called communication device.

The communication session will generally stay active until one of the respective communication devices terminates the call. Sometimes, however, the hybrid mobile device 124 may experience a loss of service with or degradation to the WiFi connection. This commonly occurs if the hybrid mobile device 124 moves out of range of the IP access point 120 or the quality of the connection with the IP access point 120 otherwise degrades. In such a scenario, it is necessary to handoff or hand over the call over to the mobile carrier network 110 to avoid terminating the communication session. This may be accomplished by creating a third communication link between the call server 102 and the hybrid mobile device 124. The third communication link, however, may be routed through the mobile carrier network 110 to the hybrid mobile device 124. When the first communication link is lost or is significantly degraded, it may be seamlessly replaced by the third communication link such that the call server 102 bridges or connects the third communication link with the second communication link to maintain the communication session.

Determining when to handoff the call to the mobile carrier network 110 may be based on any number of suitable factors. In a typical implementation, a manufacturer, carrier or network provider may determine a default set of connection characteristics below which a connection is handed off from the IP network 101 to the mobile carrier network 110. This default approach, however, may not take into account the differences between user expectations regarding connection quality, differences in networks configurations and performance capabilities, and differences between devices used to establish the connection on behalf of a user (e.g. different mobile devices). Based on these and other factors, as described in more detail below, it may be advantageous to incorporate user feedback into the algorithm used to determine when the handoff from the IP network 101 to the mobile carrier network 110 (or an alternative network 115 via an alternative network access point 111 or a different WiFi IP access point 120 for which network conditions may be more favorable) is required.

On inbound calls to the hybrid mobile device 124, a calling communication device dials the data number of the hybrid mobile device 124. This initiates a connection to the call server 102 as the data number is automatically routed to the call server 102. The call server then establishes a first communication link with the calling communication device. The call server 102 then establishes a second communication link with the hybrid mobile device 124. The call server defaults to WiFi mode in attempting to establish the communication link with the hybrid mobile device 124. If the hybrid mobile device 124 is not currently connected to an IP access point 120 and is therefore inaccessible via VoIP over WiFi, the call server will switch to cellular mode. In cellular mode, the call server will establish the second communication link over the mobile carrier network 110. This cannot be done, however, using the hybrid mobile device's 124 data number since that number is unknown to the mobile carrier network 110. To establish the second communication link between the call server 102 and the hybrid mobile device 124, the call server accesses a translation table within a database that includes data/mobile number pairs in which each pair may be associated with a hybrid mobile device 124. In this case, the call server will lookup the data number and have a mobile number returned. The call server 102 may then establish the second communication link by dialing the mobile number and establishing a connection to the hybrid mobile device 124. The call server may then join the first and second communication links to create the full-duplex communication session between the calling device and the hybrid mobile device 124.

The communication session will stay active until one of the respective communication devices terminates the call. While the communication session is in progress, the hybrid mobile device 124 may re-establish a WiFi connection. In such a scenario, it may be desirable to hand the call over to the VoIP network to reduce the burden on the mobile carrier network 110. This may be accomplished by creating a third communication link between the call server 102 and the hybrid mobile device 124. This time the third communication link may be routed over the VoIP network 101, 122 via an IP access point 120 to the hybrid mobile device 124. When the third communication link is sufficiently established, it may seamlessly replace the first communication link such that the call server 102 bridges or connects the third communication link with the second communication link to maintain the communication session.

In another outbound calling scenario, the hybrid mobile device 124 may not have an initial connection via WiFi to a packet based VoIP network 122, 101 or the WiFi connection may not be sufficiently good. An outbound call to a destination telephone number is established over the mobile carrier network 110 using the mobile number associated with the hybrid mobile device 124. For caller ID purposes, however, the calling number is the data number associated with the hybrid mobile device 124. The call is again routed to and through the call server 102. The first communication link is between the hybrid mobile device 124 and the call server. This is accomplished by having the hybrid mobile device 124 automatically place a call to the call server 102 using one of the pool of telephone numbers associated with the call server. Just prior to the call, the hybrid mobile device 124 may utilize the mobile carrier network's data services to send a message to the call server 102. The message to the call server 102 may contain the mobile and data numbers of the hybrid mobile device 124 and the destination telephone number such that when the call server 102 receives the call from the hybrid mobile device 124 using the mobile number, it can place a call to the destination telephone number and substitute the data telephone number in the caller ID field. Upon establishing the second communication link, the call server 102 may then join the first and second communication links to create the full-duplex communication session between the hybrid mobile device 124 and the destination device.

Figure 2:
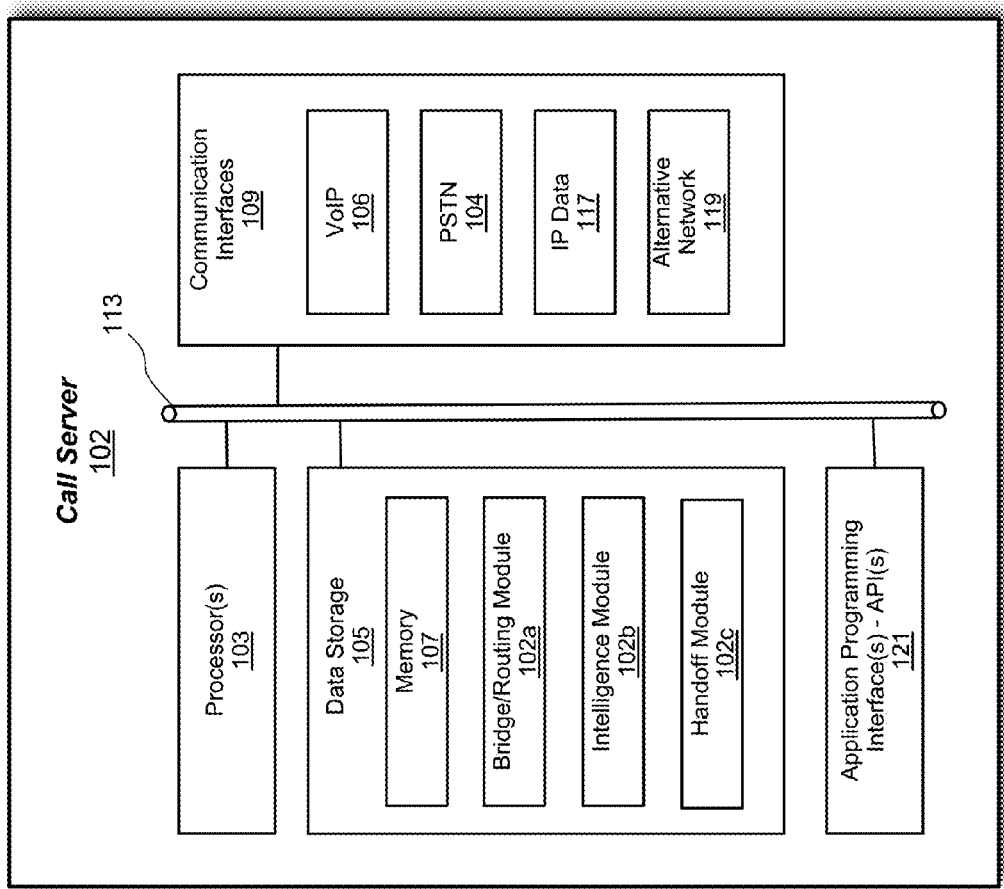
FIG. 2 illustrates an example block diagram for a call server.

FIG. 2 is a block diagram illustrating some of the functions of the call server according to one or more embodiments described herein. The call server 102 may comprise, for example, a server computer or any other system having computing capability. The schematic block diagram shows that the call server 102 may include at least one processor component 103 ("processor 103" hereinafter), at least one communication interface 109 (e.g., a network interface card or the like), and a data storage component 105, each of which is coupled to a local interface 113. The local interface 113 may comprise, for example, a data bus with an accompanying address/control bus or other bus structure as can be appreciated. Stored in the data storage component 105 are a memory 107 and multiple components 102*a*-102*c* (e.g., software applications) that are executable by the processor 103 and that provide at least some of the functionality of the call server 102.

Alternatively, a plurality of call servers 102 may be employed and may be arranged, for example, in one or more server banks or computer banks or other arrangements. For example, a plurality of call servers 102 together may comprise a cloud computing resource, a grid computing resource, and/or any other aggregated or distributed computing arrangement. Such call servers 102 may be located in a single installation or may be distributed among different geographical locations. For purposes of convenience, the call server 102 is illustrated in FIGS. 1 and 2 and referred to herein in the singular. Even though the call server 102 is referred to in the singular, it is understood that a plurality of call servers 102 may be employed in various arrangements as described above.

The communication interface(s) 109 may include a voice-over-IP (VoIP) interface 106 adapted to exchange IP based telephony signaling (e.g., SIP) and/or media data with other IP network devices using a VoIP protocol. Another communication interface 109 may be a PSTN interface 104 adapted to convert incoming PSTN audio data to VoIP audio data and convert outgoing VoIP audio data to PSTN audio data. Still another communication interface 109 may be an IP data interface 117 adapted to exchange IP data with other IP network devices. This may include IP data exchanged with a mobile wireless handset 114, 124 over an intermediate mobile carrier network 110. Yet another communication network interface 109 may be directed toward an alternative network 115 adapted to exchange data with a wireless handset 114 or a hybrid mobile device 124. Examples of alternative network(s) 115 may include, but are not limited to, WiMAX and whitespace. A whitespace network may be characterized as one that utilizes frequency spectrum that is overlapping with that of broadcast television frequency spectrum.

The call server 102 may further include several inter-operable software modules operable with application programming interfaces (APIs) 121 and communication interfaces 109 and configured to intelligently manage the communication session. These software modules may include a bridge/routing module 102a, an intelligence module 102b, and a handoff module 102c. The aforementioned software modules have functional names for convenience and ease of reference. These functional names should not be construed as limiting to the various software modules individually or the call server 102 as a whole. There may be functions performed by one or more of the software modules in conjunction with the APIs 121 and network communication interfaces 109 that achieve a stated purpose or goal.

The bridge/routing module 102a may be configured to physically or logically connect communication links. The intelligence module 102b may be configured to monitor network conditions and receive communication session data from the hybrid mobile device 124 regarding its connection with the IP access point 120 so as to intelligently determine the need for a soft handoff to or from the mobile carrier network 110. Communication session data may refer to any data relating to a communication session or its constituent communication link(s), such as, but not limited to, detected signal strengths, available networks, protocol and buffer statistics and analysis, environmental and/or geographical factors, the performance of access points and other network components, past interactions between or among communication devices, access points and other network components, context of conversations during voice calls, and other data points described herein. The call handoff module 102c may be configured to initiate a handoff from one communication link to another communication link with the assistance of the bridge/routing module 102a and the intelligence module 102b. The details of the call handoff procedure supported by the call handoff module 102c, including the incorporation of user feedback, is described in more detail below.

More specifically, the bridge/routing module 102a may cooperate with the APIs and network interfaces to physically or logically connect communication links to initially establish a communication session between communication devices and/or to perform a handoff of at least one communication link of a communication session from one network to another network. A communication session may be, for instance, between a hybrid mobile device 124 and a second telephony endpoint (e.g., 114, 116, 118). The handoff may be caused by an instruction or command received from the call handoff module 102c. The bridge/routing module 102a may be configured to physically or logically establish communication links, join communication links, and sever communication links to a common or shared communication session based on commands or instructions received from the call server 102.

The intelligence module 102b may cooperate with the APIs and network interfaces to monitor and gather (receive) data pertaining to network conditions and communication device connections with various networks. The data may then be intelligently processed to predict or determine the need for a handoff of at least one communication link of a communication session. The data received by the intelligence module 102b may also include out of band and/or out of network signaling from a communication device to indicate that a handoff is needed. In such a case, the intelligence module 102b may instruct the call server 102 to establish a new communication link via the bridge/routing module 102a and then instruct the call handoff module 102c to initiate a handoff process once the new communication link has been established.

The call handoff module 102c may cooperate with the APIs and network interfaces to effect a handoff of a first communication link between the call server 102 and the hybrid mobile device 124 to a second communication link between the call server 102 and the hybrid mobile device 124. The call handoff module 102c may receive data and instructions from the intelligence module 102b that indicates a handoff may be needed imminently based on the degrading network conditions associated with the first communication link. The need may be determined based on a handoff profile established based on a handoff profile as determined by a statistical modeling technique that was applied to a set of multiple VoIP network parameter data acquired via some form of user feedback. The call handoff module 102c may then execute certain instructions to establish a second communication link between the call server 102 and the hybrid mobile device 124. Once the second communication link has been established, the call handoff module 102c may instruct the bridge/routing module 102a to join the second communication link to the communication session with the other telephony device (114, 116, 118) prior to severing the first communication link between the call server 102 and the hybrid mobile device 124.

The call handoff module 102c may also include communication link handoff logic (CLH) designed to fit a statistical model pertaining to call quality parameters of a media stream between a communication device and the call server 102. The call server 102 CLH logic may include, for example, logic to establish a handoff profile based at least in part on user feedback used to fit a statistical model to multiple VoIP communication link parameters indicative of communication link quality.

The call server 102 may execute various applications and/or other functionality for, among other things, setting-up, managing and tearing-down communication sessions between communication devices 124 and 114, 116, 118. Also, various data may be stored in a data storage 105 via memory 107 of the call server 102. Data storage 105 illustrated in FIG. 2 may be representative of a plurality of data stores, as can be appreciated. The data stored in the data storage 105, for example, may be associated with the operation of the various applications and/or functional entities of the call server 102.

Figure 3:
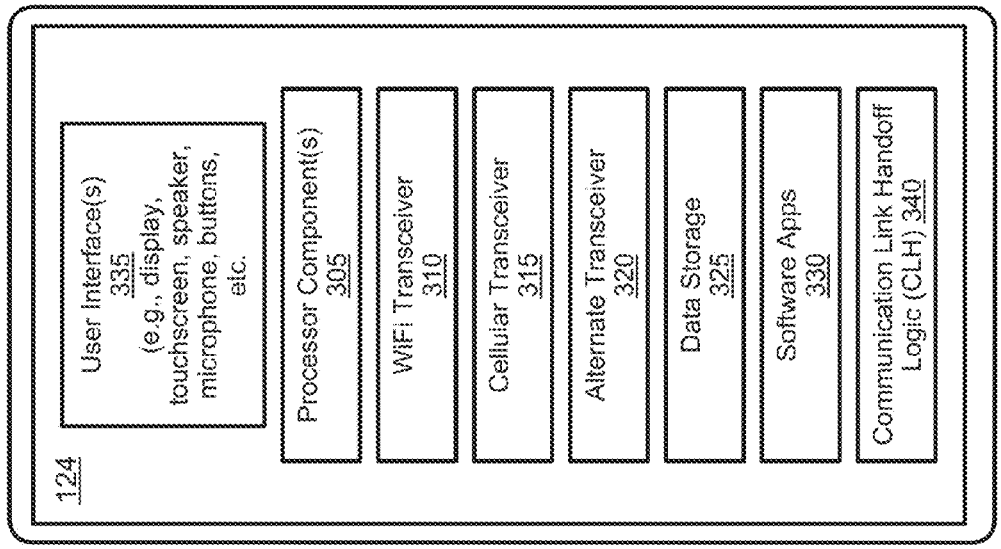
FIG. 3 illustrates an example block diagram for a hybrid mobile device.

FIG. 3 is a block diagram illustrating a hybrid mobile device 124 according to one or more embodiments described herein. The hybrid mobile device 124 may include a processor component or processor(s) 305 for controlling the various components and functions of the hybrid mobile device 124. The hybrid mobile device 124 may also include multiple RF transceivers such as, for instance, a WiFi transceiver 310, a cellular transceiver 315, and an alternate transceiver 320.

The WiFi transceiver 310 may be operable to communicate with an IP network access point 120 using one or more of the 802.11 wireless transmission protocols. Upon connection with an IP network access point 120, the hybrid mobile device 124 may exchange IP data with servers or other computers that are connected with or communicable with the Internet 101 via LAN/WAN 122. This may include the call server 102 shown in FIG. 1.

The cellular transceiver 315 may be operable to communicate with a mobile carrier network 110 for both voice and IP data communication. On the voice side, the mobile carrier network 110 may be based on GSM, CDMA, or other communication protocols while on the IP data side, the mobile carrier network 110 may be based on, for example, General Packet Radio Service (GPRS), Enhanced Data for GSM Evolution (EDGE), Evolution-Data Optimized (EV-DO), High Speed Packet Access (HSPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) etc.

In one embodiment, the alternate transceiver 320 may be a WiMAX transceiver that is operable to communicate with an IP network access point using one or more of the 802.16 wireless transmission protocols. Upon connection with a WiMAX network access point, the hybrid mobile device 124 may exchange IP data with servers or other computers that are connected with or communicable with the Internet 101 via WiMAX network 115. This may include call server 102 shown in FIG. 1. In another embodiment, the alternate transceiver 320 may be a whitespace transceiver that is operable to communicate with a whitespace network access point. The whitespace network, in turn, may be communicable with the Internet 101 to allow IP data communication between the hybrid mobile device 124 and servers or other computers that are connected with or communicable with the Internet 115. This may include call server 102 shown in FIG. 1.

The hybrid mobile device 124 may further include data storage 325, software applications 330, various user interface(s) 335 and communication link handoff (CLH) logic 340. The data storage 325 may include, for example, one or more types of memory devices including, but not limited to, flash memory usable for ROM, RAM, PROM, EEPROM, and cache. The software applications 330 may include, for example, one or more software applications executable on or by the processor(s) 305 including, but not limited to, web browsers, email applications, application specific data and/or audio/video applications, call handoff applications, etc. The user interface(s) 335 may include, for example, a display, a touchscreen for soft-key input, speaker(s), microphone(s), a keyboard for hard-key input, and one or more buttons. The CLH logic 340 may include, for example, logic to establish and execute a handoff profile based at least in part on statistically modeled user feedback regarding communication link quality.

Figure 4:
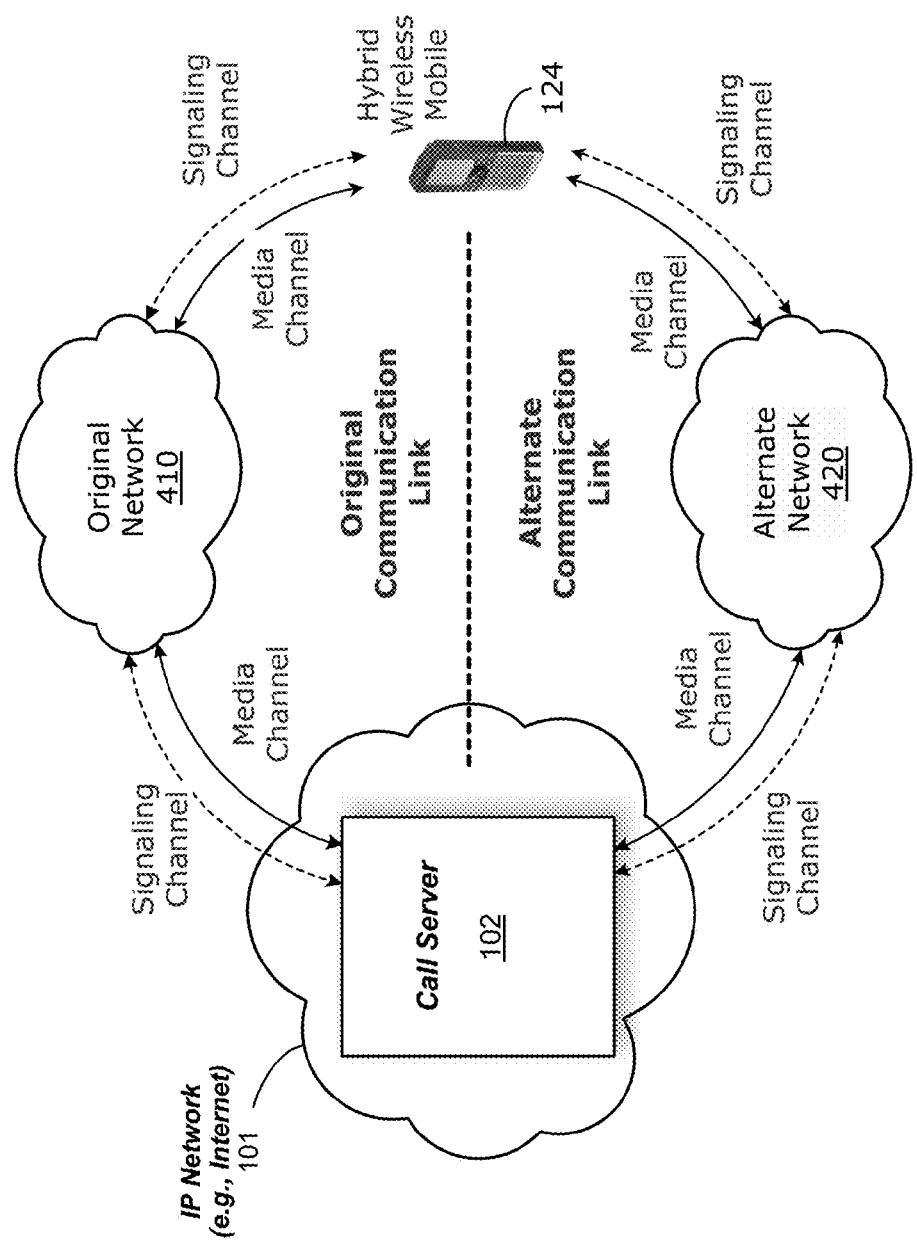
FIG. 4 illustrates an example block diagram for a communication session handoff.

FIG. 4 is a block diagram illustrating a communication session handoff between a hybrid mobile device 124 and a call server 102 utilizing different networks 510, 520 according to one or more embodiments described herein. Once a call has been established between a hybrid mobile device 124 and another communication device 410 with the call server 102 acting as a bridge connecting the two communication devices, the communication session will stay active until one of the respective communication devices terminates the call.

Sometimes, however, the hybrid mobile device 124 may experience a loss of service with or degradation to the original network 510 connection used to establish the call. The original network 510 may be a mobile carrier network 110 or an IP network 122/101. In such a scenario, it is necessary to hand the call over (e.g., handoff) to an alternate network 520 to avoid terminating the communication session. The alternate network 520 may be the opposite of the original network 510. For example, if the original network 510 was an IP network 122/101, the alternate network 520 maybe a mobile carrier network 110 and vice versa. The embodiments are not limited to these examples. There may be other alternate network(s) 520 that are neither mobile carrier network(s) 110 or IP network(s) 122/101.

The handoff may be accomplished by creating an alternate communication link between the call server 102 and the hybrid mobile device 124. The alternate communication link, however, will be routed through the alternate network 520 to the hybrid mobile device 124. When the original communication link is lost or is significantly degraded, it may be seamlessly replaced by the alternate communication link such that the call server 102 bridges or connects the alternate communication link with the communication link to the other communication device 410 to maintain the communication session.

To establish the alternate communication link, the hybrid mobile device 124 may initially send an out of band or even an out of network signal to the call server 102. A call between the hybrid mobile device 124 and a called communication device 410 by way of call server 102 may be initially setup using the Session Initiation Protocol (SIP). IP addresses and ports are exchanged and an audio (and/or video) codec is negotiated for the exchange of media. Audio (and/or video) from both ends flows using the Real-time Transport Protocol (RTP) and the selected codec(s). Any further change in the call is accomplished using SIP (e.g., one party hangs up). The hybrid mobile device 124 may also maintain an open data channel with the call server 102 using, for example, a protocol called Message Queue Telemetry Transport (MQTT). MQTT is an open message protocol for machine-to-machine communication that enables the transfer of telemetry-style data in the form of messages from pervasive devices, along high latency or constrained networks, to a server or small message broker. Pervasive devices may range from, for example, sensors and actuators, to mobile phones, embedded systems on vehicles, or laptops and full-scale computers.

The MQTT channel is not involved in the initial call setup. As long as the communication device has some sort of network connection, the MQTT channel is available. The impending handoff signal may be sent from the communication device to the server using this data channel. The MQTT channel is out of band in the sense that it is not involved with the initiation or destruction of a communication session (e.g., phone call). Nor is it in the path of the exchange of media between the hybrid mobile device 124 and the call server 102. Additionally or alternatively, the impending handoff signal could be out of band in the sense that it uses an alternative such as, for example, a text message, white space, or LTE that may be referred to herein as out of network signals.

The out of band or out of network signal may instruct the call server 102 to initiate the process of establishing an alternate communication link between the hybrid mobile device 124 and the call server 102. The out of band or out of network signal may be the result of the hybrid mobile device 124 detecting poor or degrading original network connectivity or may be based on one or more other sensor inputs indicative of the impending need for a handoff. Once the out of band or out of network signal requesting establishment of an alternate communication link is received, the call server 102 may initiate the alternate communication link by first determining on what network the original communication link is established. The call server 102 may then dial the hybrid mobile device 124 using the telephone number associated with the alternate network connection 520 to the hybrid mobile device 124. The hybrid mobile device 124 may then automatically answer the call without user notification or intervention. The call server 102 may then join the alternate communication link with communication link to the other communication device 410 to maintain the communication session before severing the original communication link between hybrid mobile device 124 and the call server 102. Alternatively, the hybrid mobile device 124 may sever the original communication link once the alternate communication link is established.

For example, if the original network connection 510 for the original communication link is a VoIP based WiFi connection, the alternate communication link may be established over a mobile carrier network via a cellular system. The hybrid mobile device 124 will have both a data telephone number associated with, in this example, the original network 510 and a mobile telephone number associated with the alternate network 520. The alternate communication link may be routed over the alternate network 520 by having the call server 102 send call establishment signaling to the hybrid mobile device 124. Since the hybrid mobile device 124 is currently connected to the call server on the original communication link, the incoming new call signaling may be acted upon without notifying the user. For instance, the hybrid mobile device 124 may not ring, vibrate, or display a call waiting message pertaining to the incoming call from the call server 102. Rather, the hybrid mobile device 124 may automatically answer the new incoming call over the alternate network 520 based on a particular piece of information in the signaling data that identifies the new call as being a handoff for the current call. For example, the out of band or out of network signal sent by the hybrid mobile device 124 to the call server 102 may include a flag or data bits uniquely signifying a request to create an alternate communication link between the hybrid mobile device 124 and the call server 102 and switch from the original communication link to the alternate communication link. In another embodiment, the call server may use a particular telephone number as the source number when signaling the hybrid mobile device 124. The particular number may be dedicated to handoff calls only.

The technique(s) described may work whether the original network 510 is an IP based VoIP network 122/101 and the alternate network 520 is a cellular based mobile carrier network 110 or vice versa. In addition, there may be other types of non-cellular based network(s) that can function as the original network 510 or alternate network 520. The embodiments are not limited to these examples.

The foregoing description relates generally to the process of handing a call off from an IP based VoIP network 101 to a cellular based carrier network 110 or an alternate network 520 (and vice versa). While the handoff process itself is useful in improving the user experience and decreasing network load by utilizing an IP based VoIP network 101 when possible, the determination regarding when to initiate the handoff and what parameters to analyze when determining that the handoff should be performed is an area that can be improved. Currently, a device manufacturer, network carrier or other similar party in the communications chain assigns default handoff metrics. This process, however, does not account for personal user preferences, user tolerance for communication link quality degradation, variations between different networks and devices and the like. Therefore, in various embodiments it may be advantageous to incorporate user feedback into the algorithm used to determine when a handoff should occur for that user. In addition, a larger data set of user feedback may also be used to refine a default (or current) handoff profile. The embodiments are not limited in this respect.

In various embodiments, a communication link may be established between a first communication device and a call server operable in an Internet Protocol (IP) based packet data network. In some embodiments, this communication link may comprise an actual call. In other embodiments, this communication link may comprise a test call established for the purpose of establishing user preferences regarding communication link quality. In still other embodiments, the communication link may be a simulated test call performed over an Internet connection between a server and a web browser or by a software application executing on a user's communication device.

During the course of the communication link (e.g. while the communication link is active), user feedback may be received indicating a level of quality of the communication link. For example, as shown in FIG. 5A, the user feedback may comprise activation of one or more input/output (I/O) devices 502 of the first communication device (e.g. mobile device) 124. In the example 500 shown in FIG. 5A, a user 504 may press and hold the down volume button 502 to indicate that the quality of the connection link is not personally sufficient. In other embodiments, as shown in FIG. 5B for example, the user feedback may comprise interaction with a graphical user interface (GUI) element 556 displayed on a touch sensitive display 554 of the first communication device (e.g. mobile device) 124. For example, if the user is utilizing speakerphone mode or a headset device (not shown), the user may have access to the touch sensitive display 602 during the connection link. In these example, the user may be presented with a graphical user interface element 556 that when pressed may indicate a personal evaluation of insufficient connection link quality as judged by the user. In still other embodiments, while not shown, the user feedback may comprise activation of one or more sensors of the first communication device (e.g. mobile device 124). For example, a user may be instructed to shake or rotate the first communication device to indicate insufficient communication link quality as judged by the user, and one or more sensors of the first communication device, such as one or more accelerometers, may detect this movement. The embodiments are not limited in this context.

In the case of an actual call (e.g. a connection between two users), the user feedback may be provided in response to a loss of call/connection quality to the point that the connection is no longer sufficient to satisfy the user's call quality expectations. For example, a loss of a few packets may not bother some users while other users may find this quality loss to be unacceptable. In the case of a test call or test communication link or a simulated communication link, one or more communication link parameters may be varied, regardless of the actual quality of the communication link, that affect the quality of the communication link to present varying communication link quality levels. Regardless of the type of connection, user feedback with respect to communication link parameters may be received in response to the changes in the quality of the communication link.

When user feedback is received, one or more communication link parameters may be determined and recorded. For example, the communication link parameters may comprise one or more of received signal strength (e.g. via a RSSI), jitter, latency, packet loss, link speed, link throughput or distance between the first communication device and an IP access point. While a limited number and type of communication link parameters are described for purposes of illustration, it should be understood that the embodiments are not limited in this respect.

In various embodiments, latency (e.g., delay) may comprise a one-way delay between a source and destination. VoIP is a real-time application that cannot tolerate long delays as the users will lose interactivity. According to the International Telecommunication Union-Telecommunication Standardization Sector (ITU-T) recommendations, one-way delay follows the following constraints: under 150 ms is acceptable; 150 to 400 ms is acceptable with limitations; and over 400 ms is unacceptable. In a VoIP telephony system, voice packets are transmitted by RTP. RTP identifies a voice stream by its unique Synchronization Source Identifier (SSRC). Additionally, individual packets can be identified by the port numbers, sequence numbers and timestamps. The time difference of the same packet at source and destination results in its one-way delay.

Jitter comprises the variation in delay of successive voice packets. Jitter occurs because different packets suffer different delays in the network. Jitter contributes in the overall delay of the voice packets. It is an estimate of the inter-arrival time of RTP packets and may be referred to as the inter-arrival jitter. If R represents the arrival time of a packet and S represents the RTP timestamp, then the inter-arrival difference D(i, j) between two packets i and j can be calculated as follows:

$$D(i, j)=(R_j-R_i)-(S_j-S_i)=(R_j-S_j)-(R_i-S_i)$$

Packet loss may also be a dominant factor in the loss of quality in a VoIP communication link. Packet loss is generally intolerable in time constrained applications like VoIP. Packet loss can be annoying because voice packets are carried by User Datagram Protocol (UDP) that does not retransmit lost packets. Packet loss may be due to congestion, interference, noise and buffer overflow at the receiver. A packet arriving after a certain scheduled play out time is also discarded. Packet loss can be mitigated using forward error correction (FEC) by transmitting redundant information and interleaving the packets. Typically, packet loss up to 10% may be acceptable in VoIP communications.

In various embodiments, an increased distance between a hybrid mobile device 124 and an IP access point 120 may result in decreased communication link quality. For example, the further a hybrid mobile device 124 is moved away from an IP access point 120, the lower the quality of the communication link. This decrease in quality can be measured, at least in part, based on signal strength via, for example, a received signal strength indicator (RSSI). Other embodiments are described and claimed. These and other communication link parameters may be measured and recorded at the time (or shortly thereafter) user feedback is received.

The one or more communication link parameters may be correlated to a loss of quality of the communication link in some embodiments. For example, when a user indicates that the quality of a communication link has degraded, the one or more communication link parameters may be recorded and associated with a loss of quality of a communication link. A handoff profile may be established based on the user tolerance levels for various communication link parameters. The handoff profile may be determined using a variety of statistical modeling techniques.

In various embodiments, a personalized handoff profile may comprise a minimum desired quality of the communication link for a voice call. The communication link may be handed off to an alternate communication link using an alternate network while maintaining a connection between the hybrid mobile device 124 and the call server 102 when the quality of the original communication link falls below that specified in the handoff profile. For example, based on the user feedback described above, a handoff profile containing a composite threshold level associated with individual communication link parameters may be assigned to the hybrid mobile device 124 at which the user provides the feedback. In this example, the handoff profile may be customized for a particular user or on a per user basis. In other embodiments, the handoff profile data may be sent to one or more call servers 102 along with the handoff profile data of other users to average the handoff profile data. The collective user data may establish a community handoff profile that may be used as an initial default handoff profile for all subsequent users. In this example, the handoff profile data may be crowd sourced such that the data comprises an average of different preferences, experiences and quality considerations across any number of users. The embodiments are not limited in this respect.

For another embodiment, the handoff profile may comprise a statistical model fit to a training set of VoIP network parameter data indicative of various VoIP network communication link parameters. The statistical model may be used to predict instantaneous VoIP channel quality using new samples of real-time VoIP parameter data. The VoIP parameter data may include main-effect parameters, interaction parameters (two-way or higher), or transformations of parameters. Some of these parameters include an RSSI between the hybrid mobile device and an IP access point, a link speed between the hybrid mobile device and an IP access point, jitter (e.g., the deviation from true periodicity of a presumed periodic signal), number of dropped packets, the number of holes in a packet stream (e.g., if data is duplicated or lost, a hole may exist in the byte stream), the average hole size, and the maximum hole size. The average and maximum hole sizes depend on a time interval applied to the calculation. Additional factors for the statistical model may be interactions of two or more of the aforementioned parameters or transformations of the aforementioned parameters, or a combination of both. For instance, the interaction of RSSI and number_of_holes may be treated as an independent parameter. Similarly, the interaction of RSSI and the natural logarithm of jitter, log(jitter), may be an independent parameter. The previous two examples are illustrative and not exhaustive. Other interactions and/or transformations of parameters, henceforth including interactions of possibly transformed parameters, may comprise a single parameter for use with the statistical models.

In another embodiment, the handoff profile may result in a raw score in which each communication link parameter and an associated weighting coefficient contributes to the raw score. For example, jitter may comprise 30% of the raw score while packet loss comprises 40%, and latency 30%. A handoff may occur when the current raw score of a packet data stream falls below a threshold raw score of a training data set. The threshold raw score may be determined based on user feedback to the training set of data. The scenario above is purely exemplary. Other combinations, coefficients, percentages, and rankings of the communication link parameters with respect to a raw score and threshold may be implemented.

A hybrid mobile device 124 as described herein may include a mechanism to force a manual handoff from an IP network 122 to a mobile carrier network 110 (e.g., cellular network) in some embodiments. In these embodiments, in response to receiving a request to handoff the communication link to an alternate communication link using an alternate network such as a mobile carrier network 110, one or more communication link parameters may be determined and the handoff profile may be established based on the request. For example, rather than requesting specific feedback from a user during a call, the system may use the request for a manual handoff as the feedback to capture the information needed to establish and/or update the handoff profile. In this embodiment, the values of the communication link parameters may be recorded at the time of manual handoff request and treated as user feedback for creating a handoff profile. Subsequent calls exhibiting communication link parameters like those at the time of the manual handoff request may initiate an automatic handoff.

In other embodiments the call server may include logic operable to simulate a test call with a user via a web browser. For example, prior to purchasing a hybrid mobile device 124, a user may have the option of establishing a test call via a tablet computing device, laptop or other similar computing device to determine or estimate the call quality that would be expected should the user decide to purchase a hybrid device. In these examples, a user may have the opportunity to place a test call over a home network and over a work network to ensure that the most commonly used IP networks provide sufficient call quality for VoIP calls prior to incurring the expense of purchasing a hybrid mobile device 124.

In another embodiment, the call server 102 may simulate the effects of the various communication link parameters and solicit user feedback. For example, the call server may establish a communication link with the hybrid mobile device 124 by creating an actual phone call with the user's hybrid mobile device 124. The phone call may be established by the user by calling a pre-determined telephone number associated with the call server 102 and reserved for call quality evaluation purposes. In another embodiment, the user may select an option from a hybrid mobile device 124 based software application that is directed to evaluating call quality. In selecting the option via a graphical user interface (GUI), a phone call is made to the pre-determined telephone number or an instruction is sent to the call server 102 to call the user's hybrid mobile device 124. Once the call is established, the call server 102 may create an audio media stream and intentionally introduce diminishing quality for parameters like packet loss, jitter, latency, etc. The call server 102 may request that the user indicate when a particular communication link parameter has degraded to the point that a handoff is desired. This may be achieved through a graphical user interface (GUI) interaction of some sort. The call server 102 and/or the hybrid mobile device 124 may then create a default handoff profile for the user based on the feedback. The handoff algorithm may then be adjusted for that user and implemented for the hybrid mobile device 124. This procedure may be repeated by the user as often as desired.

In another embodiment, a software application executing on the hybrid device 124 may simulate the same communication link parameters and acquire feedback. This may be achieved through a graphical user interface (GUI) interaction of some sort. An actual telephone call is not required in this embodiment. The acquired feedback may be used by the hybrid mobile device 124 to amend the user's handoff profile. In addition to or in lieu of, the acquired feedback may be sent to a call server 102 that maintains user handoff profiles. The user may log in to an account associated with the service such that acquired feedback may be linked to the proper user. Other embodiments are described and claimed.

In various embodiments, the foregoing functionality may be enabled by communication link handoff (CLH) logic present on either or both of the call server 102 and hybrid mobile device 124. For example, at least one machine-readable medium may comprise a set of instructions that in response to being executed on a computing device cause the computing device to perform any of the functionality, methods and/or processes described herein. In some embodiments, an apparatus may comprise a processor component, at least two radio frequency (RF) transceivers each capable of communicating with a call server over a separate network, and communication link handoff (CLH) logic to be executed by the processor component to perform any of the functionality, methods and/or processes described herein. In other embodiments, a system may comprise a processor component, memory coupled to the processor component. at least two radio frequency (RF) transceivers each capable of communicating with a call server over a separate network, one or more antennas coupled to the at least two RF transceivers, and communication link handoff (CLH) logic to be executed by the processor component to perform any of the functionality, methods and/or processes described herein. The embodiments are not limited in this respect.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6A:
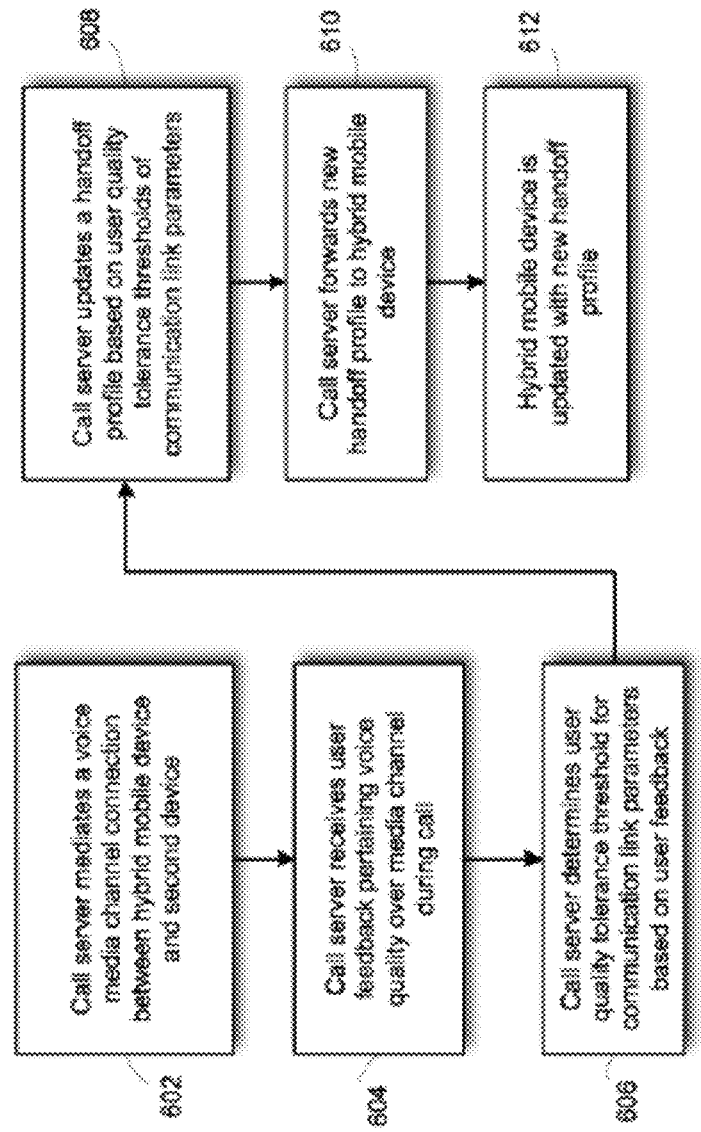
FIG. 6A illustrates an example of a first logic flow.

FIG. 6A illustrates an example of a first logic flow. As shown in FIG. 6A, the first logic flow includes a logic flow 600. Logic flow 600 may be representative of some or all of the operations executed by one or more logic, features, or devices described herein, such as any devices, systems, methods and/or techniques described above with references to FIGS. 1-5B for example. More particularly, logic flow 600 may be implemented by CLH logic 340 of a hybrid mobile device 124 or call server 102 in some embodiments. In various embodiments, the logic flow 600 may be representative of some or all of the operations associated with obtaining and utilizing user feedback to establish or update a handoff profile based on a live call between two end users. Other embodiments are described and claimed.

In the illustrated example shown in FIG. 6A, the logic flow may include a call server 102 mediating a voice media channel connection between a hybrid mobile device and a second device at 602. For example, the voice media channel connection may comprise a communication link between a hybrid mobile device 124 and a call server 102 operable in an Internet Protocol (IP) based packet data network 101 and between the call server 102 and a second communication device 114, 116, 118. For example, a communication link may be established between hybrid mobile device 124, call server 102, and a second communication device 114, 116, 118 in some embodiments.

At 604, the logic flow may include a call server 102 receiving user feedback pertaining to voice quality over the media channel during the call. For example, the user feedback received during the communication link may indicate a lack of quality of the communication link. If, in some embodiments, a user determines that the quality of the VoIP communication link less than desired for a VoIP call, the user may, among other things, hold down the down volume button for a designated period of time to provide feedback. The feedback itself may be sent over a parallel data channel between the hybrid mobile device 124 and the call server 102. Such a parallel data channel may include an MQTT channel, and/or a cellular data channel. Another mechanism for conveying the in-call user feedback to the call server 102 may be automatically construct and send an SMS message to the call server 102 using either a telephone number or SMS short code associated with the call server 102 as the destination. Other feedback mechanisms on the hybrid mobile device 124 may be implemented including manipulating other buttons on the housing of the first communication device and/or interaction with a touch screen display. The embodiments are not limited in this respect.

The logic flow may include the call server 102 and/or first communication device determining a user quality tolerance threshold for communication link parameters based on the user feedback at 606. In some embodiments, this may include determining one or more communication link parameters in response to the user feedback. The CLH logic on the hybrid mobile device 124 or the call server 102 may be operative to monitor, measure and/or record the one or more VoIP communication link parameters such as jitter, latency, or RSSI. VoIP communication link parameter data may be captured continuously throughout a call, not just when user feedback is given.

At 608, the logic flow may include the call server 102 and/or hybrid mobile device 124 updating a handoff profile for the hybrid mobile device 124 based on the user quality tolerance thresholds of communication link parameters. In various embodiments, the CLH logic may be operative to correlate the one or more communication link parameters to the lack of quality of the communication link. For example, the user feedback may trigger the CLH logic to record the one or more communication link parameters in response to the user feedback, associate these parameters with less than desired quality of the communication link and update the handoff profile of the hybrid mobile device 124 based on the communication link parameters accordingly.

At 610 the logic flow may include the call server 102 forwarding a new handoff profile to the hybrid mobile device 124 or the hybrid mobile device 124 updating its own handoff profile. For example, a new handoff profile may be established based on the correlating and this new handoff profile may be forwarded to the hybrid mobile device 124 from which the user feedback originated. The logic flow at 612 may include updating the hybrid mobile device 124 with the new handoff profile. For example, once received, the hybrid mobile device 124 may utilize the new handoff profile to make handoff decisions moving forward. In embodiments where the hybrid mobile device 124 calculated its own new handoff profile using CLH logic based on the user feedback, the hybrid mobile device 124 may update the handoff profile itself. The process may be repeated as often as desired. Other embodiments are described and claimed.

Figure 6B:
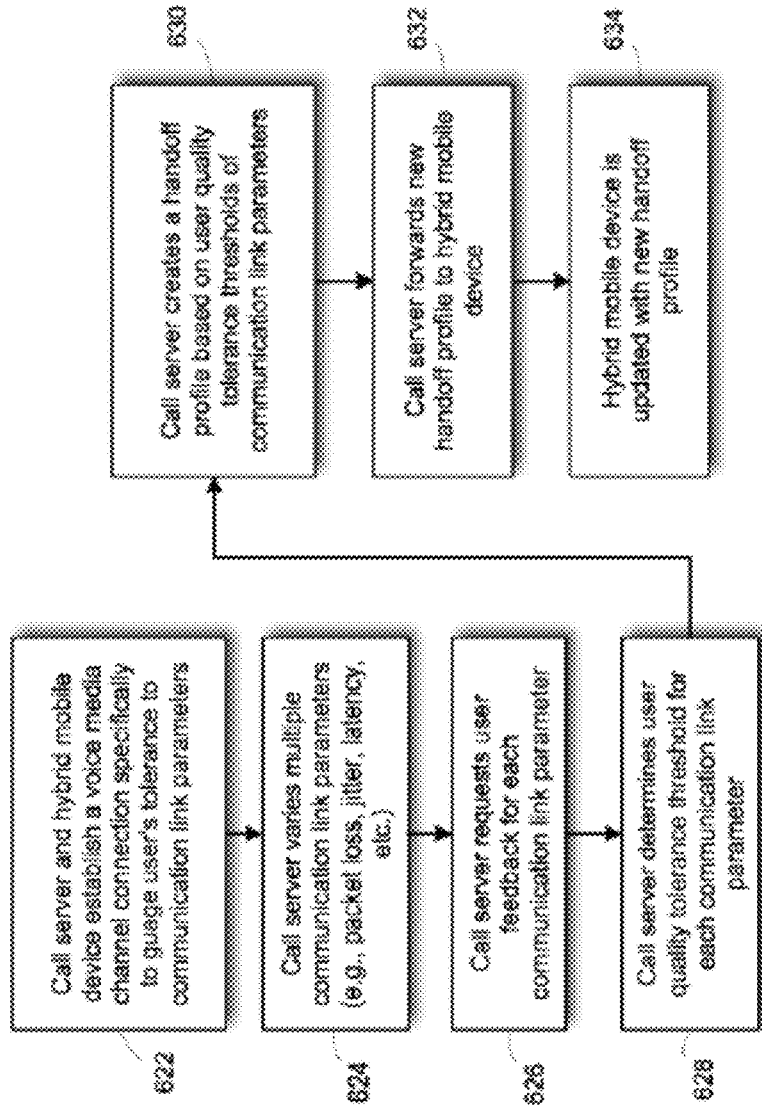
FIG. 6B illustrates an example of a second logic flow.

FIG. 6B illustrates an example of a second logic flow. As shown in FIG. 6B, the second logic flow includes a logic flow 620. Logic flow 620 may be representative of some or all of the operations executed by one or more logic, features, or devices described herein, such as any devices, systems, methods and/or techniques described above with references to FIGS. 1-5B for example. More particularly, logic flow 620 may be implemented by CLH logic 340 of a mobile device 124 and/or call server 102 in some embodiments. In various embodiments, the logic flow 620 may be representative of some or all of the operations associated with creating a specific call (e.g. a test call) between a hybrid mobile device 124 and a call server 102 wherein the call server simulates communication link parameters and/or changes in communication link parameters and solicits feedback to establish or update a handoff profile. Other embodiments are described and claimed.

At 622 the logic flow may include the call server 102 and hybrid mobile device 124 establishing a voice media channel connection specifically to gauge a user's tolerance to communication link parameters. For example, rather than establishing a link between the hybrid device 124 and the call server 102 for the purpose of connecting the hybrid device 124 to a second communication device to enable users of the devices to communicate, the communication link may instead be established for purposes of a test call. More particularly, the logic flow at 624 may include the call server 102 varying multiple communication link parameters (e.g. packet loss, jitter, latency, etc.). For example, as part of the test call, the call server 102 may vary and/or simulate variance of one or more communication link parameters to enable a user of the hybrid mobile device 124 to experience the differences in connection quality associated with the changes. The embodiments are not limited in this respect.

The logic flow at 626 may include the call server 102 requesting user feedback for each communication link parameter. In some embodiments, the call server 102 may individual adjust each communication link parameter and request user feedback for each adjustment. For example, jitter may be gradually increased until user feedback is received, then latency may be gradually increased until user feedback is received and so on. In other embodiments, different combinations of changes among the different communication link parameters may be combined and the different combinations may each be adjusted until user feedback is received.

The call server 102 and/or hybrid mobile device 124 may determine a user quality tolerance threshold for each communication link parameter as part of the logic flow at 628. For example, based on the changes to the communication link parameters and the resulting user feedback, the user quality tolerance threshold may be determined indicating a user's tolerance for each characteristic. Stated differently, the user quality tolerance threshold may comprise the minimum quality that a user will tolerate for each communication link parameter, below which it may be desirable to handoff a the VoIP communication link between the hybrid mobile device 124 and the call server 102 to another network such as a mobile carrier network 110.

At 630 the logic flow may include the call server 102 and/or the hybrid mobile device 124 creating a handoff profile based on the user quality tolerance threshold of the communication parameters. For example, the handoff profile may be unique to a hybrid mobile device 124, a user of a device, or a user of an account or may be shared across any number of devices, users or accounts. The handoff profile may comprise threshold levels for the various communication link parameters such that when one or more of the communication link parameters dips below its threshold level, initiation of a handoff of the communication link from the VoIP network to an alternate network may be commenced.

The call server 102 may forward a new handoff profile to the hybrid mobile device 124 at 632 in the logic flow and at 634 the logic may include updating the hybrid mobile device

124 with the new handoff profile. For example, once the handoff profile is established, it may be forwarded, via the call server 102 for example, to the hybrid mobile device 124 from which the user feedback originated. That originating hybrid mobile device 124 may use that handoff profile moving forward to make network and/or communication link handoff decisions. In embodiments where the hybrid mobile device 124 re-calculated the handoff profile, it may update the handoff profile itself. Other embodiments are described and claimed.

Figure 6C:
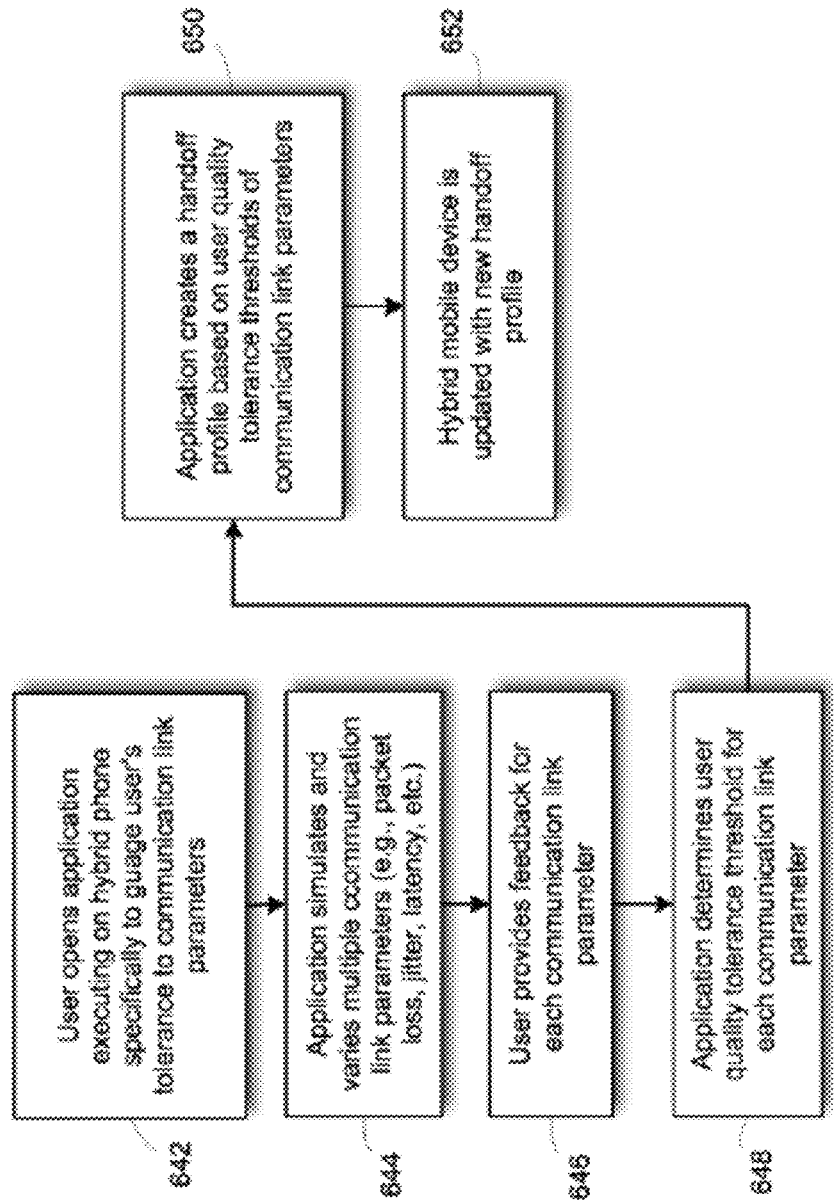
FIG. 6C illustrates an example of a third logic flow.

FIG. 6C illustrates an example of a third logic flow. As shown in FIG. 6C, the third logic flow includes a logic flow 640. Logic flow 640 may be representative of some or all of the operations executed by one or more logic, features, or devices described herein, such as any devices, systems, methods and/or techniques described above with references to FIGS. 1-5B for example. More particularly, logic flow 640 may be implemented by CLH logic 340 of a mobile device 124 in some embodiments. In various embodiments, the logic flow 640 may be representative of some or all of the operations associated with a call server simulating communication link parameters or simulating communication link parameters without involving the call server 102 and soliciting feedback on a hybrid mobile device 124 to establish or update a handoff profile via a dedicated software application or program running on the hybrid mobile device 124 without the need to establish a test call or an actual connection to another device such as the call server 102. Other embodiments are described and claimed.

In various embodiments, the logic flow at 642 may include a user opening an application executing on a hybrid mobile device 124 specifically to gauge the user's tolerance to communication link parameters and communication link parameter changes. For example, the application ("app") may comprise an application, software program or other logic stored on hybrid mobile device 124 and used for purposes of calibrating a handoff profile for the user and/or the hybrid mobile device 124. While described in terms of an application being opened by a user, the embodiments are not limited in this respect. In some embodiments, the application may be arranged to run automatically when a hybrid mobile device 124 is activated, when a hybrid mobile device 124 is powered on and/or whenever the hybrid mobile device 124 detects a new network. The embodiments are not limited in this respect.

At 644 the logic flow may include the application simulating and varying multiple communication link parameters (e.g. packet loss, jitter, latency, etc.). For example, rather than establish a real communication link or a test communication link, the application may be operative to play back an audio signal that varies in a manner that simulates variances in one or more communication link parameters. The user may provide feedback for each communication link parameter as part of the logic flow at 646. For example, as the application simulates the variations in the communication link parameters, the user may be instructed to listen and to provide feedback when the audio signal is not of an acceptable quality.

In some embodiments, the logic flow at 648 may include the application determining a user feedback tolerance threshold for each communication link parameter. As described above, the user feedback tolerance threshold may be determined based on the user feedback and one or more of the communication link parameters at the time of the user feedback to ensure that a handoff is initiated when one or more of the communication link parameters drop below the threshold, resulting in potentially poor connection quality.

At 650 the logic flow may include the application creating a handoff profile based on the user quality tolerance threshold of the communication link parameters and at 652 the logic flow may include the hybrid mobile device 124 being updated with the new handoff profile. For example, once the handoff profile is established by the application, it may be stored on the hybrid mobile device 124 containing and/or executing the application and on which the user feedback was received. The hybrid mobile device 124 may use that handoff profile moving forward to make network and/or communication link handoff decisions. Other embodiments are described and claimed.

Figure 6D:
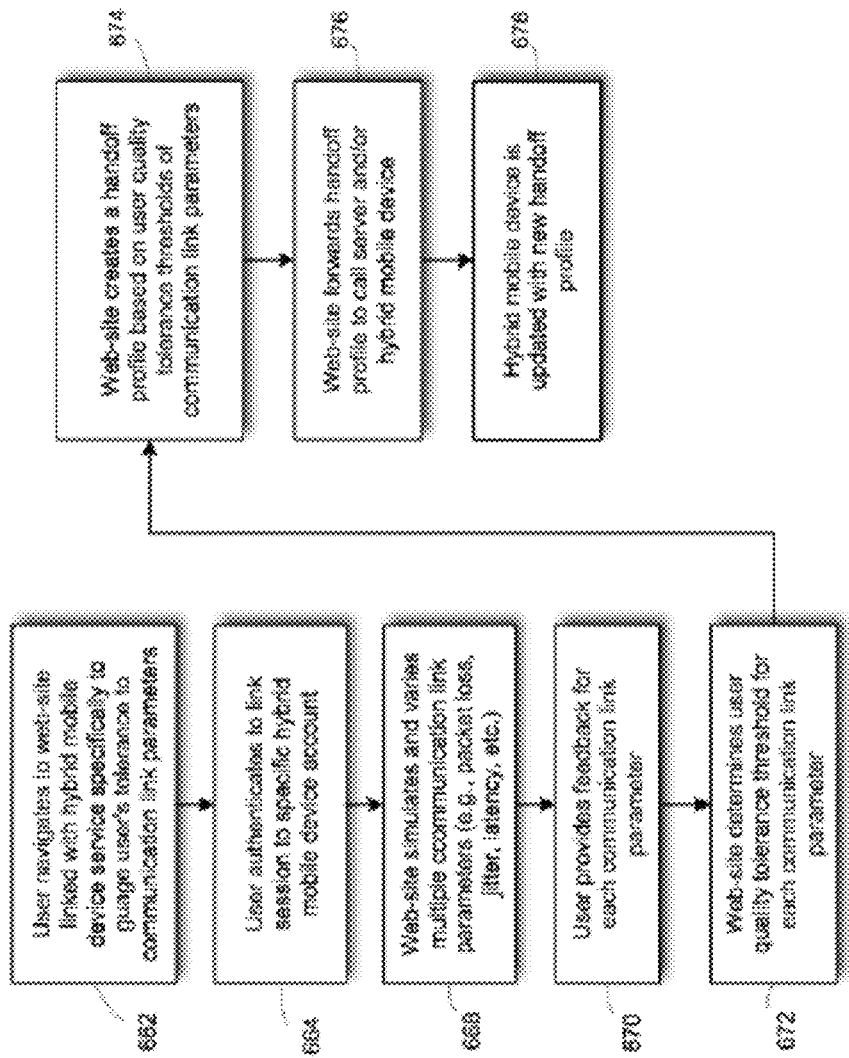
FIG. 6D illustrates an example of a fourth logic flow.

FIG. 6D illustrates an example of a fourth logic flow. As shown in FIG. 6D, the fourth logic flow includes a logic flow 660. Logic flow 660 may be representative of some or all of the operations executed by one or more logic, features, or devices described herein, such as any devices, systems, methods and/or techniques described above with references to FIGS. 1-5B for example. More particularly, logic flow 660 may be implemented by CLH logic 340 of a portion of a call server 102 in some embodiments. Alternatively, a separate web-server may be stood up just for this purpose. In various embodiments, the logic flow 660 may be representative of some or all of the operations associated with a call server simulating communication link parameters or communication link parameters being simulated without involving the call server 102 wherein feedback is solicited via a website or web browser that is operative to act as a substitute for the hybrid mobile device 124 to establish or update a handoff profile without the need to establish a test call or an actual connection to a call server 102 and also without the need to possess or involve the hybrid mobile device 124. Other embodiments are described and claimed.

In various embodiments, the logic flow at 662 may include a user navigating to a website linked with a hybrid mobile device 124 service specifically to gauge the user's tolerance to communication link parameters. For example, a website, web server or other server available via the Internet may be accessible by a user or a prospective user of a hybrid mobile device 124. This website may be operative to present one or more communication link parameters and/or simulate a connection that the user may utilize for establishing communication connections with a hybrid mobile device 124. Other embodiments are described and claimed.

At 664 the logic flow may include the user providing authentication information to link a session to a specific hybrid mobile device account. For example, a user may log in to the website to access an existing account with a service provider or may be prompted to create a new account if they do not already have an account. In various embodiments the logic flow may include the website simulating and/or varying multiple VoIP communication link parameters (e.g. packet loss, jitter, latency, etc.) at 668. For example, and as recited above with respect to logic flow 640, rather than establish a real communication link or a test communication link, the website may be operative to play back audio signals that vary in a manner that simulates variances in one or more VoIP communication link parameters. The user may provide feedback for each communication link parameter as part of the logic flow at 670. For example, as the website simulates the variations in the communication link parameters, the user may be instructed to listen and to provide feedback when the audio signal is not of an acceptable quality.

In various embodiments, at 672 the logic flow may include the website determining a user feedback tolerance threshold for each VoIP communication link parameter, at 674 the logic flow may include the website creating a handoff profile based on the user quality tolerance threshold of communication link parameters, at 676 the logic flow includes the website forwarding the handoff profile to a call server 102 and/or a hybrid mobile device 124 and at 678 the logic flow includes a hybrid mobile device 124 being updated with the new handoff profile. The user feedback tolerance threshold may be determined based on the user feedback and one or more of the communication link parameters at the time of the user feedback. Similarly, the handoff profile may be additionally modified on VoIP communication link parameters obtained through monitoring subsequent calls and not necessarily through user feedback to ensure that a handoff is initiated for the user of the associated account when one or more of the VoIP communication link parameters drop below the threshold, resulting in potentially poor connection quality. In various embodiments, once the handoff profile is established by the website, it may be associated with a user account based on the authentication information. The call server 102 or hybrid mobile device 124 may use that handoff profile moving forward to make network and/or communication link handoff decisions for that user and/or the handoff profile may be forwarded to a hybrid mobile device 124 associated with the user's account and provisioned on that hybrid mobile device 124. Other embodiments are described and claimed.

Figure 6E:
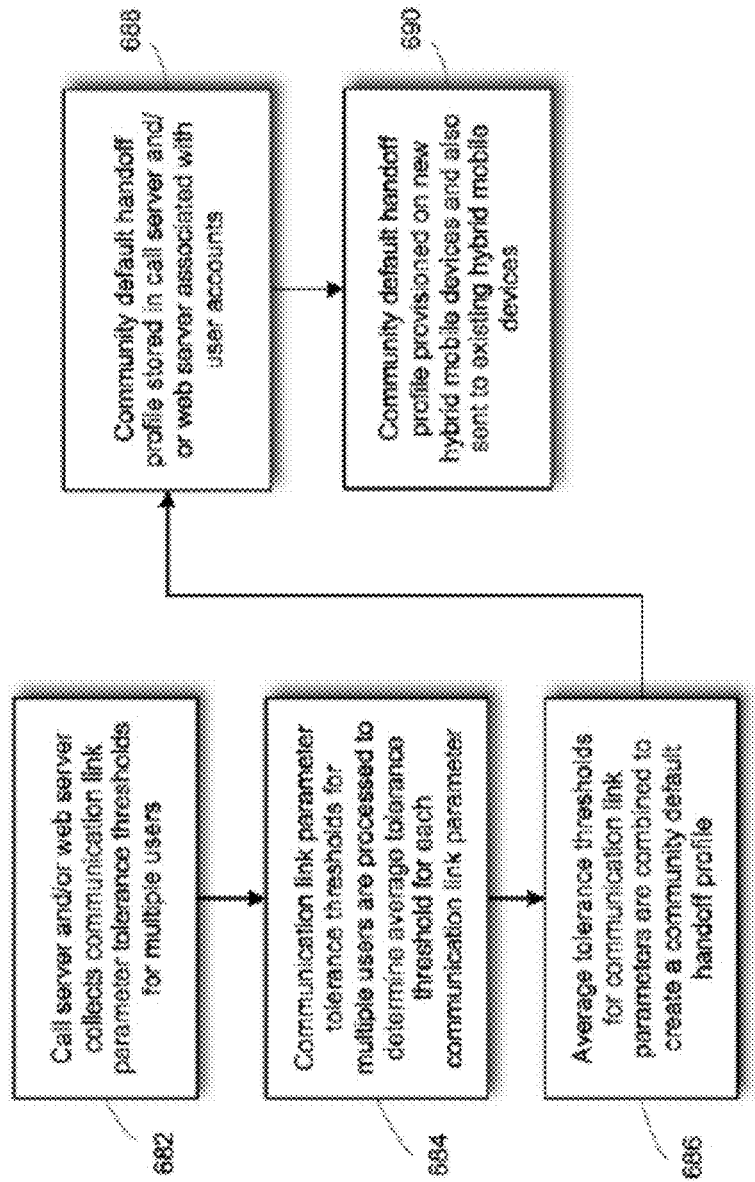
FIG. 6E illustrates an example of a fifth logic flow.

FIG. 6E illustrates an example of a fifth logic flow. As shown in FIG. 6E, the fifth logic flow includes a logic flow 680. Logic flow 680 may be representative of some or all of the operations executed by one or more logic, features, or devices described herein, such as any devices, systems, methods and/or techniques described above with references to FIGS. 1-5B for example. More particularly, logic flow 680 may be implemented by CLH logic 340 of a call server 102 in some embodiments. In various embodiments, the logic flow 680 may be representative of some or all of the operations associated with obtaining and utilizing user feedback from multiple users and/or multiple hybrid mobile devices 124 to establish or update a community handoff profile. Other embodiments are described and claimed.

At 682 the logic flow may include the call server 102 and/or web server collecting communication link parameter tolerance thresholds for multiple users. For example, using any one or more of the above-described methods, communication link parameter tolerance thresholds may be gathered for multiple users. The logic flow at 684 may include the communication link parameter tolerance thresholds for the multiple users being processed to determine average tolerance thresholds for each communication link parameter. For example, the threshold for each parameter (e.g. jitter, latency, interactions and transformations, etc.) may be averaged across any number of the received communication link parameter tolerance thresholds. In various embodiments, at 686 the logic flow may include averaging the tolerance thresholds for each communication link parameter to create a community default handoff profile. For example, the community default handoff profile may comprise a combination of preferences for any number of users that are used to establish baseline thresholds for an entire community of users, rather than relying on device or user specific thresholds. Averaging is but one embodiment for obtaining tolerance thresholds. Other embodiments for determining tolerance thresholds for each communication link parameter include, but are not limited to, weighted averages, trimmed averages, medians, quantiles, and combinations thereof.

The logic flow at 688 may include the community default handoff profile being stored in a call server 102 and/or a web server associated with one or more user accounts. For example, once established the community default handoff profile may be stored on a web server or call server 102 used by the one or more devices to establish communication connections. In some embodiments, the logic flow at 690 may include the community default handoff profile being provisioned on new hybrid mobile devices 124 and/or sent to existing hybrid mobile devices 124. For example, as new hybrid mobile devices 124 are added to or associated with the call server 102, these hybrid mobile devices 124 may be provisioned with the community default handoff profile. Similarly, existing hybrid mobile devices 124 already associated with the call server may be updated with the newly established or updated community default handoff profile. Other embodiments are described and claimed.

Figure 7B:
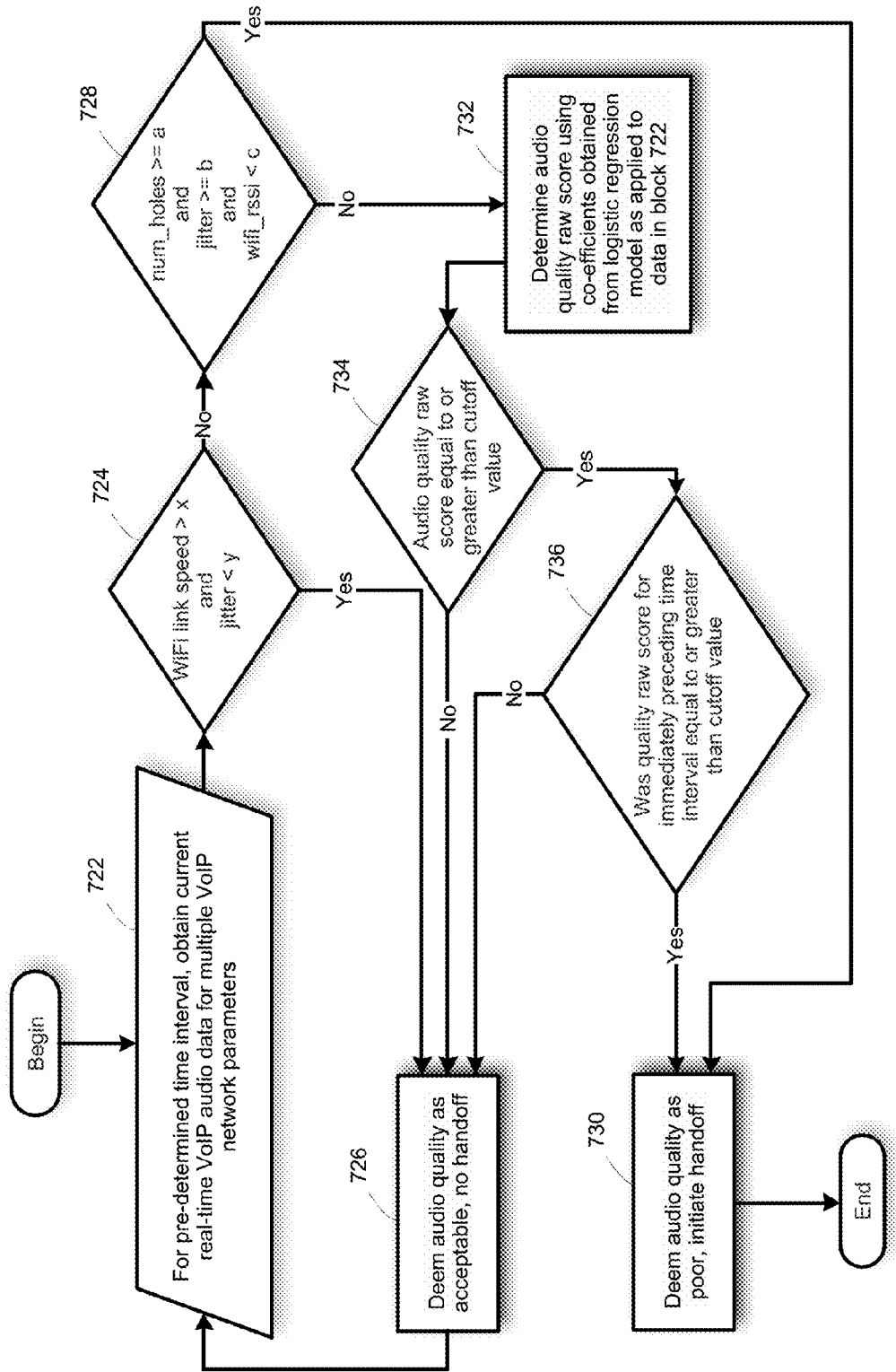
FIG. 7B illustrates an example of a seventh logic flow.

FIG. 7A illustrates an example of a sixth logic flow. Logic flow 700 may be representative of some or all of the operations executed by one or more logic, features, or devices described herein, such as any devices, systems, methods and/or techniques described above with references to FIGS. 1-5B for example. More particularly, logic flow 700 may be implemented by CLH logic 340 of a hybrid mobile device 124 or call server 102 in some embodiments. In addition, the logic flows in FIGS. 7A-7D may be implemented by a separate computer server such that a resulting statistical model for a handoff profile may be loaded onto and executed for predictions by the hybrid mobile device 124 and/or the call server 102 for real-time use. In various embodiments, the logic flow 700 may be representative of some or all of the operations associated with crafting a logistic regression statistical model functioning as a handoff profile. The logistic regression statistical model may be used for quality predictions on a real-time audio packet stream to determine if the VoIP channel currently in use should be abandoned in favor of an alternate communication link. Other embodiments are described and claimed.

The logic flow 700 may obtain a time-lined data set of multiple VoIP communication link parameters from VoIP audio streams involving a particular hybrid mobile device 124 at block 702. In addition, the timeline for the obtained data set may further include points of user input specifying a subjective indication of acceptable and/or poor quality of the audio stream. For example, a user may establish a VoIP connection between a hybrid mobile device 124 and an IP access point 120 to be used for a VoIP telephony call. In one embodiment, the aforementioned VoIP connection may be made specifically as a test connection with a call server to obtain the time-lined data set of VoIP communication link parameters. In another embodiment, the aforementioned VoIP connection may be part of an actual call during which the user provides real-time feedback pertaining to call quality to obtain the time-lined data set of VoIP communication link parameters. It should be noted that when a user provides feedback pertaining to VoIP call quality, there is a slight lag between the actual VoIP communication link parameter measurements and the time it takes for the user's response to those parameters to be registered at a server collecting such data. Thus, the server may intentionally shift the timeline of the feedback backwards along the packet data stream by some pre-determined interval to reflect such a lag. Doing so increases the accuracy of the user feedback by more accurately linking it with the VoIP communication link parameter settings that caused the feedback.

The result of block 702 is a time-lined data set of multiple VoIP communication link parameters from VoIP audio streams involving a particular hybrid mobile device 124 and a corresponding judgment of acceptable or poor quality at any given point along the continuum of the time-lined data set. In block 704, a statistical model known as a logistic regression model may be fit to the data set of multiple VoIP communication link parameters to determine a set of coefficients for each of the multiple VoIP communication link parameters. Some of the parameters used in the statistical model may be a result of transformations and/or two-way or higher order interactions from the original VoIP parameters. As described earlier, a set of VoIP communication link parameters may include, but are not limited to, an RSSI between the hybrid mobile device and an IP access point, a link speed between the hybrid mobile device and an IP access point, jitter, the number of dropped packets in a packet data stream, the number of holes in a packet data stream (e.g., if data is duplicated or lost, a hole may exist in the byte stream), the average hole size, and the maximum hole size. Examples of transformed parameters may be the interaction between RSSI number_of_holes, or the interaction of RSSI and the natural logarithm of jitter, log(jitter). There may be additional transformed parameters as well, including any number of applications of transformations and interactions to parameters and combinations thereof including interactions of possibly transformed parameters.

The logic flow 700 may fit a logistic regression statistical model to the data set obtained in block 702 at block 704. The logistic regression statistical model may determine a set of coefficients to apply to each of the multiple VoIP communication link parameters and transformed parameters. The coefficients, in turn, may be used in producing a raw score indicative of overall VoIP audio quality at block 704 with a linear combination of the coefficients and multiple real-time VoIP communication link parameters and transformed parameters. The raw score threshold may be constructed in block 706 such that subsequent scores at or above the raw score threshold calculated from real-time data are indicative of poor overall audio quality. The raw score threshold may be determined by choosing a value such that the weighted number of true positives (where the model correctly predicts poor overall audio quality as subjectively rated by a user) and true negatives (where the model correctly predicts acceptable overall audio quality as subjectively rated by a user) are appropriately balanced for the training data set.

The coefficients associated with the logistic regression statistical model may be determined in a computer server equipped to perform such calculations. The computer server may be independent of the call server 102 and/or the hybrid mobile device 124. Once computed, the coefficients may be loaded into the communication link handoff logic 340 of the hybrid mobile device 124.

FIG. 7B illustrates an example of a seventh logic flow. Logic flow 720 may be representative of some or all of the operations executed by one or more logic, features, or devices described herein, such as any devices, systems, methods and/or techniques described above with references to FIGS. 1-5B for example. More particularly, logic flow 720 may be implemented by CLH logic 340 of a hybrid mobile device 124 or call server 102 in some embodiments.

FIG. 7B describes a logic flow 720 for processing real-time VoIP audio data to determine if a handoff from a VoIP communication link to an alternate communication link is warranted. The real-time VoIP audio stream may be segmented into discrete pre-determined time intervals. In block 722, VoIP audio data for multiple VoIP communication link parameters may be obtained for a current time interval by the communication link handoff logic 340 of the hybrid mobile device 124, for instance. The communication link handoff logic 340 of the hybrid mobile device 124 may perform an initial check of the link speed parameter and the jitter parameter. In decision block 724, if both parameters satisfy the pre-determined threshold inequalities, the audio quality is deemed acceptable at block 726 and logic flow control returns to block 722 to obtain the next set of VoIP audio data for the next time interval. If either the link speed or jitter fail the initial inequality check, control is passed to a second decision block 728 in which additional VoIP communication link parameters are evaluated. In block 728, the number of holes (num_holes), jitter, and RSSI are compared to additional respective threshold values. Note that the jitter threshold in decision block 728 need not be the same as the jitter threshold in decision block 724. If any of the three parameters in decision block 728 satisfy the pre-determined threshold inequalities, the audio quality is deemed poor at block 730 and the logic flow initiates a handoff from the VoIP communication link to an alternative communication link. If all three of the parameters in decision block 728 fail the respective pre-determined threshold inequality checks, an audio quality raw score is determined at block 732 using the coefficients obtained from the logistic regression model as applied to the current time interval data of block 722. In other words, the coefficients determined in logic flow 700 of FIG. 7A are applied to the current time-interval VoIP network parameter data to obtain a raw score for the current time-interval VoIP network parameter data.

At decision block 734, it is determined whether the current audio quality raw score for the current time-interval VoIP network parameter data calculated in block 732 is at or above the raw score threshold calculated in block 704 of FIG. 7A. If it is determined that the audio quality raw score calculated in block 732 is less than the raw score threshold calculated in block 704 of FIG. 7A as per the comparison performed at decision block 734, the audio quality is deemed acceptable at block 726 and logic flow control returns to block 722 to obtain the next set of VoIP audio data for the next time interval. On the other hand, if it is determined that the audio quality raw score calculated in block 732 is equal to or greater than the raw score threshold calculated in block 704 of FIG. 7A as per the comparison performed at decision block 734, control may be passed to a second decision block 736 to determine if the audio quality raw score for the immediately preceding time interval is also equal to or greater than the threshold raw score. If so, the audio quality is deemed poor at block 730 and the logic flow initiates a handoff from the VoIP communication link to an alternative communication link. If not, the audio quality is deemed acceptable at block 726 and logic flow control returns to block 722 to obtain the next set of VoIP audio data for the next time interval.

FIGS. 7A-7B are based on a particular type of statistical model known as logistic regression modeling. FIGS. 7C-7D are based on more generalized forms of statistic modeling. Some examples include, but are not limited to, decision trees, random forests, and kernel regression and classification.

FIG. 7C illustrates an example of an eighth logic flow. Logic flow 740 may be representative of some or all of the operations executed by one or more logic, features, or devices described herein, such as any devices, systems, methods and/or techniques described above with references to FIGS. 1-5B for example. More particularly, logic flow 740 may be implemented by CLH logic 340 of a hybrid mobile device 124 or call server 102 in some embodiments. In various embodiments, the logic flow 740 may be representative of some or all of the operations associated with crafting a statistical model based on a training set of data that functions as a handoff profile in a telecommunications system when fit to a set of real-time data. The statistical model may be fit to a real-time audio packet stream to determine if the VoIP channel currently in use should be abandoned in favor of an alternate communication link. Other embodiments are described and claimed.

The logic flow 740 may obtain a time-lined data set of multiple VoIP communication link parameters from VoIP audio streams involving a particular hybrid mobile device 124 at block 742. In addition, the timeline for the obtained data set may further include points of user input specifying a subjective indication of acceptable and/or poor quality of the audio stream. For example, a user may establish a VoIP connection between a hybrid mobile device 124 and an IP access point 120 to be used for a VoIP telephony call. In one embodiment, the aforementioned VoIP connection may be made specifically as a test connection with a call server to obtain the time-lined data set of VoIP communication link parameters. In another embodiment, the aforementioned VoIP connection may be part of an actual call during which the user provides real-time feedback pertaining to call quality to obtain the time-lined data set of VoIP communication link parameters. It should be noted that when a user provides feedback pertaining to VoIP call quality, there is a slight lag between the actual VoIP communication link parameter measurements and the time it takes for the user's response to those parameters to be registered at a server collecting such data. Thus, the server may intentionally shift the timeline of the feedback backwards along the packet data stream by some pre-determined interval to reflect such a lag. Doing so increases the accuracy of the user feedback by more accurately linking it with the VoIP communication link parameter settings that caused the feedback.

The result of block 742 is a time-lined data set of multiple VoIP communication link parameters from VoIP audio streams involving a particular hybrid mobile device 124 and a corresponding judgment of acceptable or poor quality at any given point along the continuum of the time-lined data set. In block 744, a statistical model may be fit to the data set of multiple VoIP communication link parameters to instantaneously estimate a probability of poor overall VoIP audio quality. Some of the parameters used in the statistical model may be a result of transformations and/or two-way or higher order interactions from the original VoIP parameters. As described earlier, a set of VoIP communication link parameters to be statistically modeled may include, but are not limited to, an RSSI between the hybrid mobile device and an IP access point, a link speed between the hybrid mobile device and an IP access point, jitter, the number of dropped packets in a packet data stream, the number of holes in a packet data stream (e.g., if data is duplicated or lost, a hole may exist in the byte stream), the average hole size, the maximum hole size, and transformed parameters. Examples of transformed parameters may be the interaction between RSSI number_of_holes, or the interaction of RSSI and the natural logarithm of jitter, log(jitter). There may be additional transformed parameters as well, including any number of applications of transformations and interactions to parameters and combinations thereof.

The statistical model may be determined in a computer server equipped and/or programmed to perform such calculations. The computer server may be independent of the call server 102 and/or the hybrid mobile device 124. Once computed, the statistical model may be loaded into the communication link handoff logic 340 of the hybrid mobile device 124. Once loaded, the model may be used to predict instantaneous overall VoIP audio quality with discrete sets of real-time VoIP network parameter data.

FIG. 7D illustrates an example of a ninth logic flow. Logic flow 750 may be representative of some or all of the operations executed by one or more logic, features, or devices described herein, such as any devices, systems, methods and/or techniques described above with references to FIGS. 1-5B for example. More particularly, logic flow 750 may be implemented by CLH logic 340 of a hybrid mobile device 124 or call server 102 in some embodiments.

FIG. 7D describes a logic flow 750 for processing real-time VoIP audio data to determine if a handoff from a VoIP communication link to an alternate communication link is warranted. The real-time VoIP audio stream may be segmented into discrete pre-determined time intervals. In block 752, VoIP audio data for multiple VoIP communication link parameters may be obtained for a current time interval by the communication link handoff logic 340 of the hybrid mobile device 124, for instance. The communication link handoff logic 340 of the hybrid mobile device 124 may perform an initial check of the link speed parameter and the jitter parameter. In decision block 754, if both parameters satisfy the pre-determined threshold inequalities, the audio quality is deemed acceptable at block 756 and logic flow control returns to block 752 to obtain the next set of VoIP audio data for the next time interval. If either the link speed or jitter fail the initial inequality check, control is passed to a second decision block 758 in which additional VoIP communication link parameters are evaluated. In block 758, the number of holes (num_holes), jitter, and RSSI are compared to additional respective threshold values. Note that the jitter threshold in decision block 758 need not be the same as the jitter threshold in decision block 754. If any of the three parameters in decision block 758 satisfy the pre-determined threshold inequalities, the audio quality is deemed poor at block 760 and the logic flow initiates a handoff from the VoIP communication link to an alternative communication link. If all three of the parameters in decision block 758 fail the respective pre-determined threshold inequality checks, a statistical model may be fit to the current VoIP audio data set of multiple VoIP communication link parameters obtained in block 752.

At decision block 764, an outcome of the statistical model is determined that yields an estimate as to whether the overall quality of the VoIP audio data is acceptable or poor. If it is determined that the overall VoIP audio is acceptable as per the outcome of decision block 764, the audio quality is deemed acceptable at block 756 and logic flow control returns to block 752 to obtain the next set of VoIP audio data for the next time interval. On the other hand, if it is determined that the overall VoIP audio is poor as per the outcome of decision block 764, control may be passed to a second decision block 766 to determine if there is a pattern in predicted poor audio, as determined by the statistical model, to suggest overall poor audio quality in the VoIP communication link. If so, the audio quality is deemed poor at block 760 and the logic flow initiates a handoff from the VoIP communication link to an alternative communication link. If not, the audio quality is deemed acceptable at block 756 and logic flow control returns to block 752 to obtain the next set of VoIP audio data for the next time interval.

Figure 8A:
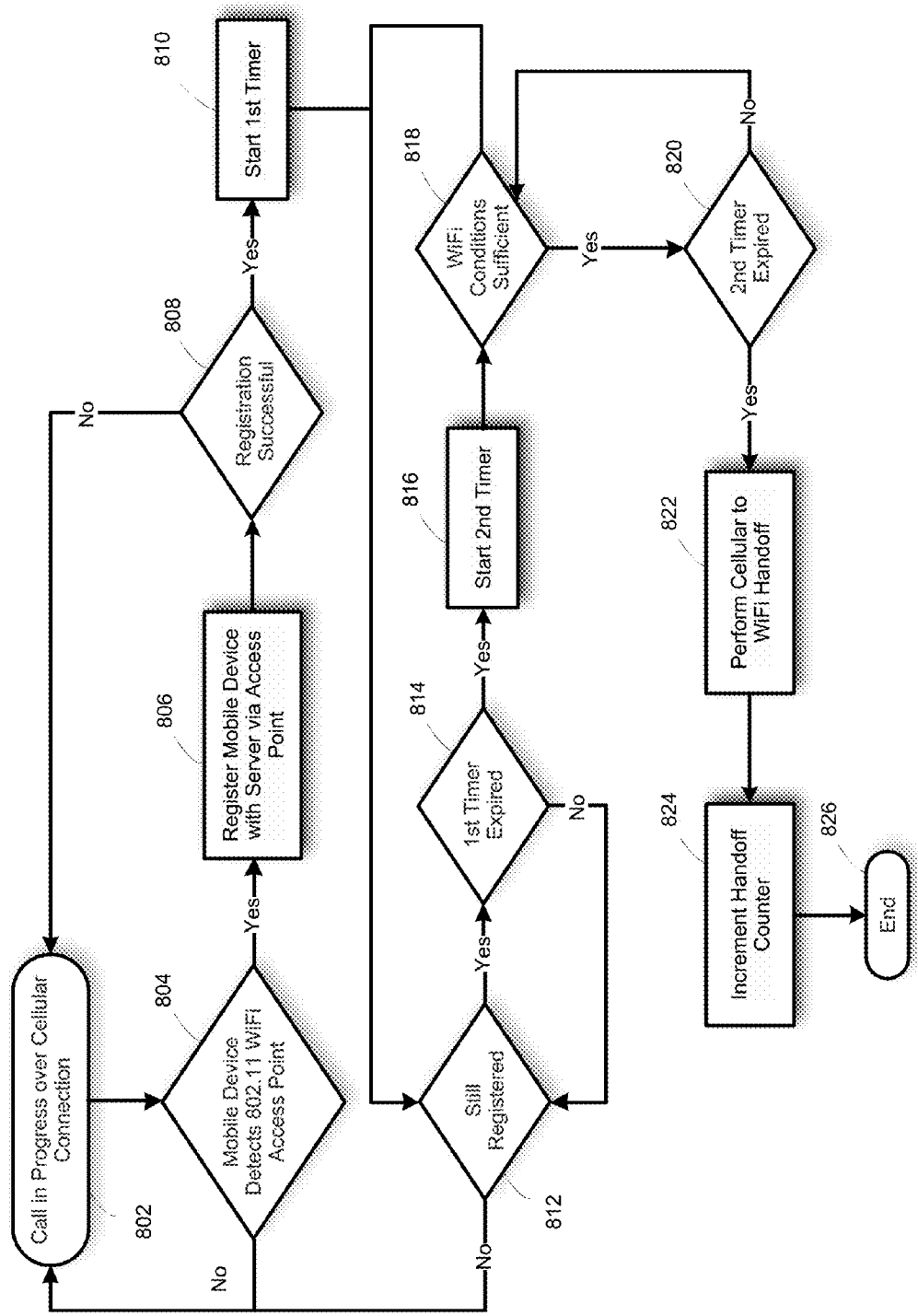
FIG. 8A illustrates an example of a tenth logic flow.

FIG. 8A illustrates an example of a tenth logic flow 800. Logic flow 800 may be representative of some or all of the operations executed by one or more logic, features, or devices described herein, such as any devices, systems, methods and/or techniques described above with references to FIGS. 1-5B for example. More particularly, logic flow 800 may be implemented by CLH logic 340 of a hybrid mobile device 124 or call server 102 in some embodiments.

Figure 8B:
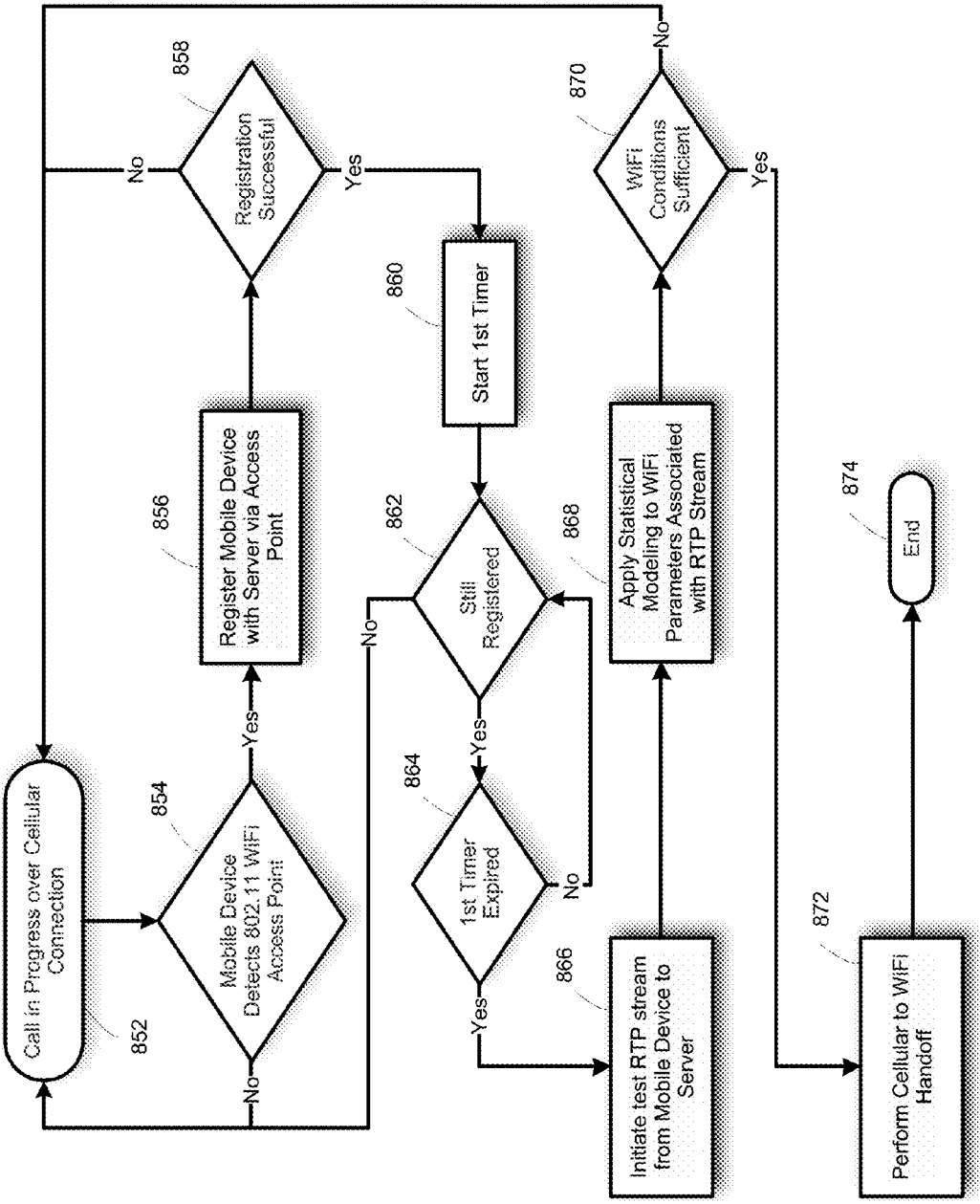
FIG. 8B illustrates an example of en eleventh logic flow.

FIGS. 8A-8B describe logic flows 800, 850 for determining whether to handoff an ongoing call from a cellular link to a VoIP communication link. The cellular link may be a circuit switched RF connection such as a Global System for Mobile Communication (GSM) cellular link or a Code Division Multiple Access (CDMA) cellular link. In addition, the cellular link may also comprise a cellular data link including but not limited to, EDGE, GPRS, EV-DO, HSPA, UMTS, 3G, LTE, VoLTE, etc. In the case of a cellular data link, voice may be packaged using the VoIP standard and transported wirelessly over any one of the aforementioned cellular data links.

Referring to FIG. 8A, in block 802, a telephone call over a cellular link is in progress between a mobile device and another endpoint telephony device. The telephone call may be circuit switched GSM/CDMA or over a cellular data link as enumerated above. The mobile device via its 802.11 transceiver may continually poll for and detect available 802.11 access points at block 804. Upon detection of such an 802.11 access point, the mobile device may attempt to register with the call server via the 802.11 access point at block 806. If the registration is deemed unsuccessful at block 808, the logic flow returns to block 802 (cellular call in progress) and awaits another detection of an 802.11 wireless access point. If the registration is deemed successful at block 808, a first timer may be started at block 810. A purpose of the first timer is to ensure that the current registration between the mobile device and the server via the 802.11 access point remains successful for a minimum duration. In one embodiment, a ten second duration is sufficient for the first timer. The exact duration of the first timer is a design choice and should not be considered limiting.

After the first timer is initiated at block 810, the registration status is checked at block 812. If the registration between the mobile device and the server via the 802.11 access point is lost, the logic flow returns to block 802 (cellular call in progress) and awaits another detection of an 802.11 wireless access point. If the registration between the mobile device and the server via the 802.11 access point remains active, the first timer is checked to see if it has expired yet at block 814. If not, the logic flow returns to check the registration status at block 812. Once the first timer is expired and the registration status remains active, a second timer may be initiated at block 816. The purpose of the second timer may be to ensure that good enough WiFi conditions to sustain a VoIP call are present a specified amount of time before initiating a handoff. The goal may be to avoid handing off to a WiFi network that may be fleeting in nature. The registration and conditions may be satisfactory but may not be sustainable. If WiFi conditions at block 818 are insufficient, control is returned to block 812 to check the registration status of the mobile device with the call server via the 802.11 access point. If WiFi conditions at block 816 are sufficient, it is determined whether the second timer has expired yet at block 820. If not yet expired, control is returned to block 818 to make sure WiFi conditions are still sufficient. If the second timer has expired at block 820, the mobile device may instruct the call server or the call server may instruct the mobile device to initiate a handoff from the cellular link to the 802.11 WiFi link at block 822. Upon completion of the handoff at block 822, a handoff counter is incremented at block 824.

The WiFi conditions may also be referred to as communication link parameters and may comprise one or more of received signal strength (e.g. via a RSSI), jitter, latency, packet loss, link speed, link throughput or distance between the first communication device and an 802.11 access point. While a limited number and type of communication link parameters are described for purposes of illustration, it should be understood that the embodiments are not limited in this respect While the first timer ensures that the mobile device can successfully register and remain with the call server via the 802.11 access point, the second timer may be used to ensure that the WiFi conditions/communication link parameters are sufficient and remain sufficient for another period of time before committing to a handoff. In one embodiment, the second timer may be calculated using a formula such as, for instance, 15 (seconds)*$2^{(handoff\ increment\ value-1)}$. Thus, if there have been no handoffs for the call as yet (increment=0), the second timer would be $15*2^{-1}$=7.5 seconds. For a handoff increment=1, the second timer would be $15*2^{0}$=15 seconds. For a handoff increment=2, the second timer would be $15*2^{1}$=30 seconds. For a handoff increment=3, the second timer would be $15*2^{2}$=60 seconds. Thus, the second timer duration will double for each subsequent handoff. This methodology may be designed to limit the number of handoffs by making sure conditions on the 802.11 WiFi network are and remain sufficient for a period of time that gives confidence that the call will not continually bounce between handoffs. The exact duration of the second timer is a design choice and should not be considered limiting.

FIG. 8B illustrates an example of an eleventh logic flow 850. Logic flow 850 may be representative of some or all of the operations executed by one or more logic, features, or devices described herein, such as any devices, systems, methods and/or techniques described above with references to FIGS. 1-5B for example. More particularly, logic flow 800 may be implemented by CLH logic 340 of a hybrid mobile device 124 or call server 102 in some embodiments.

Referring to FIG. 8B, in block 852, a telephone call over a cellular link is in progress between a mobile device and another endpoint telephony device. As above, the telephone call may be circuit switched GSM/CDMA or over a cellular data link as enumerated above. The mobile device via its 802.11 transceiver may continually poll for and detect available 802.11 access points at block 854. Upon detection of such an 802.11 access point, the mobile device may attempt to register with the call server via the 802.11 access point at block 856. If the registration is deemed unsuccessful at block 858, the logic flow returns to block 852 (cellular call in progress) and awaits another detection of an 802.11 wireless access point. If the registration is deemed successful at block 858, a first timer may be started at block 860. A purpose of the first timer is to ensure that the current registration between the mobile device and the server via the 802.11 access point remains successful for a minimum duration. In one embodiment, a ten second duration is sufficient for the first timer. The exact duration of the first timer is a design choice and should not be considered limiting.

After the first timer is initiated at block 860, the registration status is checked at block 862. If the registration between the mobile device and the server via the 802.11 access point is lost, the logic flow returns to block 852 (cellular call in progress) and awaits another detection of an 802.11 wireless access point. If the registration between the mobile device and the server via the 802.11 access point remains active, the first timer is checked to see if it has expired yet at block 864. If not, the logic flow returns to check the registration status at block 862. Once the first timer is expired and the registration status remains active, the mobile device may initiate a test RTP stream of data to the call server at block 866. A statistical modeling technique as described above with reference to FIGS. 7A-D may then be applied to the WiFi/communication link parameters associated with the test RTP stream at block 868. If the statistical modeling results indicate insufficient WiFi conditions at block 870, the logic flow returns to block 852 (cellular call in progress) and awaits another detection of an 802.11 wireless access point. If the statistical modeling results indicate sufficient WiFi conditions at block 870, the mobile device may instruct the call server or the call server may instruct the mobile device to initiate a handoff from the cellular link to the 802.11 WiFi link at block 822.

Figure 9:
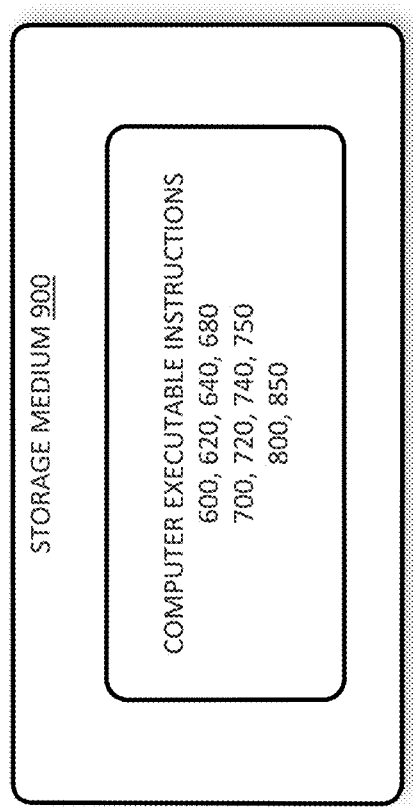
FIG. 9 illustrates an example of a storage medium.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine-readable medium, such as an optical, magnetic or semiconductor storage. Storage medium 900 may store various types of computer executable instructions, such as instructions to implement one or more of logic flows 600, 620, 640, 660, 680, 700, 720, 740, 750, 800 and/or 850. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. At least one machine-readable non-transitory medium comprising a set of instructions that in response to being executed on a computing device cause the computing device to:
while in a communication session between a mobile device and a call server over a circuit switched cellular communication link,
detect an 802.11 network access point;
register the mobile device with the call server over the 802.11 network access point;
maintain, without interruption, the registration between the mobile device and the call server over the 802.11 network access point for a specified first duration;
following expiration of the first duration, maintain Voice-over Internet Protocol (VoIP) communication link parameters that are sufficient to sustain a VoIP communication session over the 802.11 link between the mobile device and the call server for a specified second duration; and
perform a handoff between the mobile device and the call server from the circuit switched cellular communication link to the 802.11 link upon successful expiration of the second duration.

2. The at least one machine-readable non-transitory medium of claim 1, the VoIP communication link parameters comprising at least two of: a received signal strength (RSSI) between the mobile device and an IP access point, a link speed between the mobile device and an IP access point, jitter, latency, the number of dropped packets in a packet data stream, the number of holes in a packet data stream (num_holes), the average hole size, the maximum hole size, and transformed parameters.

3. The at least one machine-readable non-transitory medium of claim 1, the specified first duration set to a minimum of ten seconds.

4. The at least one machine-readable non-transitory medium of claim 1, the specified second duration set to a minimum of five seconds.

5. The at least one machine-readable non-transitory medium of claim 1, comprising instructions that in response to being executed on the computing device cause the computing device to increment a handoff counter each time a handoff occurs during a communication session wherein the specified second duration set according to: second duration=15 seconds$*2^{(handoff\ counter-1)}$.

6. The at least one machine-readable non-transitory medium of claim 5, wherein the handoff counter counts handoffs from a circuit switched cellular communication link to an 802.11 link and handoffs from an 802.11 link to a circuit switched cellular communication link.

7. The at least one machine-readable non-transitory medium of claim 1, wherein the circuit switched cellular communication link between the mobile device and the call server comprises one of a Global System for Mobile Communications (GSM) cellular link or Code Division Multiple Access (CDMA) cellular link.

8. An apparatus, comprising:
a processor component;
communication link handoff (CLH) logic to be executed by the processor component to:
while in a communication session between a mobile device and a call server over a circuit switched cellular communication link,
detect an 802.11 network access point;
register the mobile device with the call server over the 802.11 network access point;
maintain, without interruption, the registration between the mobile device and the call server over the 802.11 network access point for a specified first duration;
following expiration of the first duration, maintain Voice-over Internet Protocol (VoIP) communication link parameters that are sufficient to sustain a VoIP communication session over the 802.11 link between the mobile device and the call server for a specified duration; and perform a handoff between the mobile device and the call server from the circuit switched cellular communication link to the 802.11 link upon successful expiration of the second duration.

9. The apparatus of claim 8, the VoIP communication link parameters comprising at least two of: a received signal strength (RSSI) between the mobile device and an IP access point, a link speed between the mobile device and an IP access point, jitter, latency, the number of dropped packets in a packet data stream, the number of holes in a packet data stream (num_holes), the average hole size, the maximum hole size, and transformed parameters.

10. The apparatus of claim 8, the specified first duration set to a minimum of ten seconds.

11. The apparatus of claim 8, the specified second duration set to a minimum of five seconds.

12. The apparatus of claim 8, the communication link handoff (CLH) logic to be executed by the processor component to:
cause the computing device to increment a handoff counter each time a handoff occurs during a communication session wherein the specified second duration set according to: second duration=15 seconds*$2^{(handoff\ counter-1)}$.

13. The apparatus of claim 12, wherein the handoff counter counts handoffs from a circuit switched cellular communication link to an 802.11 link and handoffs from an 802.11 link to a circuit switched cellular communication link.

14. The apparatus of claim 8, wherein the circuit switched cellular communication link between the mobile device and the call server comprises one of a Global System for Mobile Communications (GSM) cellular link or Code Division Multiple Access (CDMA) cellular link.

15. A computer implemented method, comprising:
while in a communication session between a mobile device and a call server over a circuit switched cellular communication link,
detecting an 802.11 network access point;
registering the mobile device with the call server over the 802.11 network access point;
maintaining, without interruption, the registration between the mobile device and the call server over the 802.11 network access point for a specified first duration;
following expiration of the first duration, maintaining Voice-over Internet Protoccol (VoIP) communication link parameters that are sufficient to sustain a VoIP communication session over the 802.11 link between the mobile device and the call server for a specified second duration; and
performing a handoff between the mobile device and the call server from the circuit switched cellular communication link to the 802.11 link upon successful expiration of the second duration.

16. The computer implemented method of claim 15, the VoIP communication link parameters comprising at least two of: a received signal strength (RSSI) between the mobile device and an IP access point, a link speed between the mobile device and an IP access point, jitter, latency, the number of dropped packets in a packet data stream, the number of holes in a packet data stream (num_holes), the average hole size, the maximum hole size, and transformed parameters.

17. The computer implemented method of claim 15, the specified first duration set to a minimum of ten seconds.

18. The computer implemented method of claim 15, the specified second duration set to a minimum of five seconds.

19. The computer implemented method of claim 15, comprising:
incrementing a handoff counter each time a handoff occurs during a communication session wherein the specified second duration set according to: second duration=15 seconds*$2^{(handoff\ counter-1)}$.

20. The computer implemented method of claim 19, wherein the handoff counter counts handoffs from a circuit switched cellular communication link to an 802.11 link and handoffs from an 802.11 link to a circuit switched cellular communication link.

21. The computer implemented method of claim 15, wherein the circuit switched cellular communication link between the mobile device and the call server comprises one of a Global System for Mobile Communications (GSM) cellular link or Code Division Multiple Access (CDMA) cellular link.

* * * * *